US008198390B2

(12) United States Patent
Zhou et al.

(10) Patent No.: US 8,198,390 B2
(45) Date of Patent: Jun. 12, 2012

(54) SELF ASSEMBLED GRAFTED POLYMERIC LAYER FOR USE IN BIOSENSOR TECHNOLOGY

(75) Inventors: Cheng Zhou, Leuven (BE); Gustaaf Borghs, Leuven (BE); Wim Laureyn, Leuven (BE)

(73) Assignee: IMEC, Leuven (BE)

( * ) Notice: Subject to any disclaimer, the term of this patent is extended or adjusted under 35 U.S.C. 154(b) by 30 days.

(21) Appl. No.: 12/763,062

(22) Filed: Apr. 19, 2010

(65) Prior Publication Data

US 2010/0204415 A1    Aug. 12, 2010

Related U.S. Application Data

(62) Division of application No. 11/120,756, filed on May 3, 2005, now Pat. No. 7,728,094.

(51) Int. Cl.
*C08G 77/12* (2006.01)
(52) U.S. Cl. .................. 528/31; 528/38; 528/30; 528/41
(58) Field of Classification Search .................... 528/31, 528/38, 30, 41
See application file for complete search history.

(56) References Cited

U.S. PATENT DOCUMENTS 5,686,549 A    11/1997    Grainger et al.

OTHER PUBLICATIONS

Bearinger, J.P., *Chemisorbed Poly(Propylene Sulphide)-Based Copolymers Resist Biomolecular Interactions*. 2003 Nature Publishing Group. 250-264.
Brewer, et al. *Chemical Force Microscopy of Mixed Self-Assembled Monolayers of Alanethiols on Gold: Evidence for Phase Separation*, Langmuir 2004, 20, 4109-4115.
Buseman-Williams, et al., *Formation and Characerization of Patterned Heterogeneous Silane Films*, Notes, Langmuir 2004, 20 2026-2029.
Byfield, et al. *Biochemical Aspects of Biosensors*, Biosensors & Bioelectronics 9 (1994) pp. 373-400.
Chaki, *Self-Assembled Monolayers as a Tunable platform for Biosensor Applications*, Biosensors & Bioeletronics 17 (2002) 1-12.
Falconnet, et al, *A Combined Photolithographic and Molecular-Assembly Approach to Produce Functional Micropatterns for Applications in the Biosciences*, Advanced Functional Materials, 2004, 14 No. 8, pp. 749-756.
Fick, et al, *Swelling Behavior of Self-Assembled Monolayers of Alkanethiol-Terminated Poly(ethylene glycol): A Neutron Reflectometry Study*, Langmuir 2004, 20, 3848-3853.
Geissler, et al., *Patterning: Principles and Some New Developments*, Advanced Materials, 2004, 16 No. 15, Aug. pp. 1249-1269.
Gothelf, Kurt *Attachment of Alkyltrichlorosilanes to the Terminal 3, 5-Dihydroxyphenyl Moiety of a Self-Assembled Thiol Monolayer on Gold*, Journal of Colloid and Interface Science 255, 356-362 (2002).

Johnson, et al., *Polymercaptosiloxane Anchor Films for Robust Immobilization of Biomolecules to Gold Supports*, Langmuir 2003, 19, 10288-10294.
Mrksich, M, *Using Microcontact Printing to Pattern the Attachment of Mammalian Cells to Self-Assembled Monolayers of Alkanethiolates on Transparent Films of Gold and Silver*, Experimantal Cell Research 235, 305-313 919970 Article No. EX973668, 1997.
Ostuni, et al., *The Interaction of Proteins and Cells with Self-Assembled Monolayers of Alkanethiolates on Gold and Silver*, Colloids and Surfaces B: Biointerfaces 15 (1999) 3-30.
Schlenoff, et al., *Stability and Self-Exchange in Alkanethiol Monolayers*, J. Am. Chem Soc. 1995, 117 12528-12536.
Sethi, et al., *Transducer Aspects of Biosensors*, Biosensors & Bioelectronics 9 (1994) pp. 243-264.
Shriver-Lake, L.C. *Siland-Modified Surfaces for Biomatetial Immobilization*, 1-10.
Sun, et al., *Spontaneous Polymer Thin film Assembly and Organization Using Mutually Immescible Side Chains*, J. Am. Chem Soc. 1996 118, 1856-1866.
Xia, *Functionalized Poly(ethylene Glycol)-Grafted Polysiloxane Monolayers for Control of Protein Binding*, Langmuir 2002, 18, 3255-3262.
Zammatteo, et al. *Comparison Between Different Strategies of Covalent Attachment of DNA to Glass Surfaces to Build DNA Microarrays*, Analytical Biochemistry 280, 143-150 (2000).
Zhan, et al, *Self-Assembly and Adsorbtion of Diblock Copolymers from Selective Solvents*, Macromolecules 1994, 27, 677-682.

*Primary Examiner* — Kuo-Liang Peng
(74) *Attorney, Agent, or Firm* — Knobbe Martens Olson & Bear LLP

(57) ABSTRACT

A water soluble functional polyethylene glycol-grafted polysiloxane polymer comprising a polysiloxane backbone and polyethylene glycol side chains is provided having the general formula:

(1)

$$\begin{array}{c} B \\ | \\ [CH_2]_v \\ \underbrace{\phantom{XXXX}}_{n} \\ CH_2 \\ | \\ CH_2 \\ | \\ O \\ | \\ CH_3 \quad A \quad [CH_2]_m \quad CH_3 \quad CH_3 \\ | \quad | \quad | \quad | \quad | \\ CH_3-Si-O-(Si-O)_x-(Si-O)_y-(Si-O)_z-Si-CH_3 \\ | \quad | \quad | \quad | \quad | \\ CH_3 \quad CH_3 \quad CH_3 \quad [CH_2]_w \quad CH_3 \\ | \\ D \end{array}$$

wherein A is selected from the group consisting of hydrogen, methyl, methoxy and functional polyethylene glycol based chains, B is a functional group for binding biologically-sensitive materials, D is a functional group for binding to a substrate, m is from 3 to 5, v is from 0 to 5, w is from 4 to 11, x is from 0 to 35 and z is from 1 to 33. In order to be water soluble, the polysiloxane polymer h the following properties: x+y+z is from 8 to 40, n is from 8 to 30, and y is from 7 to 35.

20 Claims, 8 Drawing Sheets

SELF ASSEMBLED GRAFTED POLYMERIC LAYER FOR USE IN BIOSENSOR TECHNOLOGY

CROSS-REFERENCE TO RELATED APPLICATION

This application is a divisional of U.S. application Ser. No. 11/120,756 filed May 3, 2005, which is incorporated by reference herein in its entirety, and is hereby made a part of this specification.

FIELD OF THE INVENTION

The present invention relates to a water soluble functional PEG-grafted polysiloxane polymer, to a method for the synthesis of such a polysiloxane polymer, to a method for the deposition of such a polysiloxane polymer onto a substrate, to a method for forming a patterned layer of such a polysiloxane polymer and to the use of such polysiloxane polymers in biosensor technology.

BACKGROUND OF THE INVENTION

Biosensor technology has improved rapidly in the past decade because of its potential application in areas such as diagnosis of diseases, monitoring of clinical or environmental samples, fermentation and bio-processes, testing of pharmaceutical or food products, and early warning chemical and biological warfare detection systems. Generally, a biosensor is an analytical device, which uses biologically-sensitive materials for detecting biological or chemical species without the need for complex sample processing.

Biosensors are usually made by immobilizing a biologically sensitive material to a suitable transducer system, which converts the biochemical response into a quantifiable and processable electrical signal (Sethi R. S. Biosens. Bioelectron., 1994, 9, 243). The biologically-sensitive materials can be enzymes, multi-enzyme systems, organelles, membrane components, complete cells, antibodies or antigens, whole slices of mammalian or plant tissues, and the like. These materials are responsible for the recognition of the test or target species in the mixture that is analysed and provide the selectivity and sensitivity of the final sensor device. For immobilising these biological components onto the transducer surface, the transducer surface is first modified to form a suitable interface, e.g., by providing it with a suitable interface layer. This interface layer plays a key role in the biosensor performance. Several critical parameters of the biosensor, such as stability, reliability, sensitivity and selectivity, ultimately depend on the properties of this interface layer (Byfield M. P. and Abuknesha in Biosens. Bioelectron., 1994, 9, 373).

For this purpose, self-assembled monolayers (SAMs) technology provides a powerful tool to generate an interface layer on a variety of substrates [Chaki N. K. and Vijayamohanan K. Biosens. Bioelectron. 2002, 17, 1]. For this kind of SAMs, a wide variety of chemical manipulation procedures can be utilised to achieve immobilisation of the biological-sensitive materials in a quantitatively and spatially controllable way [Ostuni E. et al., Colloids and Surfaces B: Biointerfaces 1999, 15, 3], [Zammatteo N. et al., Anal. Biochem. 2000, 280, 143], [Shriver-Lake L. C., in: Immobilized Biomolecules in Analysis, Eds. Cass A. E. G. and Ligler F. A., Oxford University Press, Oxford, UK, 1998, 1-14].

For substrates based on, for example, gold, silver, platinum, copper and GaAs, alkane thiol SAMs are mostly used. However, there are several limitations to the use of these kinds of alkane thiol SAMs. Firstly, the stability of alkane thiol has always been an issue of debate [Gothelf K. V. and Larsen A. G., Journal of Colloid and Interface Science 2002, 255, 356], [Bearinger, J. P. et al., Nat. Mater. 2003, 2, 259]. Their limited robustness has limited their application in cell based biosensors [Mrksich M., Dike L. E., Tien J., Ingber D. E., Whitesides G. M. in Exp. Cell Res., 1997, 235, 305]. Another important limitation is that the use of multi-component alkane thiol SAMs or mixed SAMs to control the density of the functional groups usually results in non-uniform structure caused by the micro-phase separation of different components [Brewer N. J. and Leggett G. J. Langmuir 2004, 20, 4109]. In addition, the density of the surface functional group cannot be easily controlled. It is assumed that the ratio of the two components in a mixed alkane thiol solution will determine the ratio of the two components in the resulting monolayer. However, this ratio may change when the two alkane thiol components, for example, chemisorb onto the substrate due to the possible adsorption kinetic difference of these two alkane thiols.

On the other hand, functional organo-silane SAMs are mainly used to modify oxide and glass surfaces. A main drawback of the organo-silane SAMs is that the density of the functional groups on the surface cannot be controlled easily. Attempts to control the functional group density either consist of complex surface modification procedures or result in non-uniform molecular structure [Buseman-Willams J. and Berg J. C., Langmuir 2004, 20, 2026].

Recently, a kind of self-assembled polymeric monolayer, which is able to chemisorb onto a gold surface through multiple thiol or disulfide groups grafted on the polymer backbone, has been reported. Compared to alkanethiol SAMs, this kind of self-assembled polymeric monolayer has improved stability by cooperative binding through multiple thiol-gold or disulfide-gold bonds [Johnson, P. A.; Levicky, R. Langmuir 2003, 19, 10288], [Sun, F. et al., J. Am. Chem. Soc. 1996, 118, 1856]. Levicky R. et al. demonstrated a thiol-derived polysiloxane, i.e. poly(mercaptopropyl)methylsiloxane, on the gold support. DNA oligonucleotides can be immobilised onto this polymeric interface with improved stability (Johnson, P. A.; Levicky, R., Langmuir 2003, 19, 10288). However, suitable cross-linker molecules had to be used to derive this polymeric interface in order to introduce suitable functional group onto the surfaces. The procedure complicates the surface modification and sometimes results in poor reproducibility. Meanwhile, the density of the surface functional groups cannot be controlled under these conditions.

Xia N. et al. reported an improved self-assembled polymeric monolayer on gold substrates (Xia, N.; Hu, Y. H.; Grainger, D. W.; Castner, D. G., Langmuir 2002, 18, 3255). A poly(methylhydrosiloxane) backbone with a molecular weight of 4500 was grafted with dialkyl disulfide chains, 600 Mw methoxy-terminated poly(ethylene glycol) (PEG) chains, and 3400 Mw PEG side chains terminated with N-hydroxysuccinimide (NHS) reactive ester groups. The ability of using this functionalized PEG-grafted polysiloxane monolayer to control protein binding was demonstrated. Despite the advantages reported by Xia et al., there are still several main drawbacks that could not be overcome easily. First, due to the limited solubility of this PEG-grafted polysiloxane polymer in other solvents, toluene has to be used as a solvent to prepare the polymeric monolayer. Toluene is a toxic solvent and thus disadvantageous to use when bio-related applications are considered. A lot of bio-molecules, such as short peptide (RGD for example), extra-cellular materials, biotin, and the like, which can serve as functional groups to immobilize the biologically-sensitive materials, cannot be integrated into this graft polysiloxane polymer due to the incompatibility of toluene with these bio-molecules. Using toluene as a solvent thus greatly limits the applications of this grafted polysiloxane polymer in the biosensor field. Furthermore, the architecture of the polymeric monolayer is not optimal when the polymeric monolayer is prepared from a toluene solution. For this PEG-grafted polysiloxane polymeric monolayer, the ideal architecture is a stratified structure, wherein the PEG side chains are enriched at the outermost surface to interact with biologically-sensitive material, the polysiloxane backbones present in between, and the alkyl disulfide chains stay close to the gold surface. However, when toluene is used as a solvent to prepare the polymeric monolayer, a lot of PEG side chains are buried under the polysiloxane backbones. At the same time, the surface coverage and packing density of the resulting polymeric monolayer are limited. These architectural problems are induced by the solvent effect on the organization of the PEG side chains and polysiloxane backbones. As a consequence, the nonspecific adsorption increases due to the exposed hydrophobic polysiloxane backbones and the defects in the polymeric monolayer, and the specific binding decreases because parts of the functional groups (active ester) are buried under the polysiloxane backbones.

In addition, for the polymer reported by Xia et al., there are two different kinds of PEG chains grafted onto the polysiloxane backbone. One kind of PEG chain has methoxy end groups, and is used to decrease the nonspecific adsorption. The other kind of PEG chain has active ester end groups, and is used to specifically immobilize a biomolecule. Counting the alkane disulfide chains also grafted onto the polysiloxane backbones, there is a total of three components that are grafted onto the polysiloxane backbones. For such a complex structure, the controllability of the graft ratio and the yield of the product are poor in the polymer synthesis step. Consequently, due to the poor controllability of the graft ratio, the surface density of the functional groups is not well controllable in the resulting polymeric monolayer. Moreover, due to the steric repulsion between the two kinds of PEG chains, the grafted ratio of the PEG chains with functional groups (active ester groups, for example) cannot go higher. This means that the surface density of the functional groups is limited to a low degree, which in turn significantly decreases the immobilisation capacity of the surface. This is a big disadvantage in biosensor applications.

SUMMARY OF THE INVENTION

It is an object to provide a water soluble functional PEG-grafted polysiloxane polymer, a method for the synthesis of such a polysiloxane polymer, a method for the deposition of such a polysiloxane polymer from an aqueous solution onto a substrate, a method for forming a patterned layer of such a polysiloxane polymer from an aqueous solution onto a substrate and to the use of such polysiloxane polymers in biosensor technology.

The above objectives are accomplished by a method and device according to the preferred embodiments.

In a first aspect, a water soluble functional polyethylene glycol or PEG-grafted polysiloxane polymer comprising a polysiloxane backbone and functional polyethylene side chains, the polymer having the general formula:

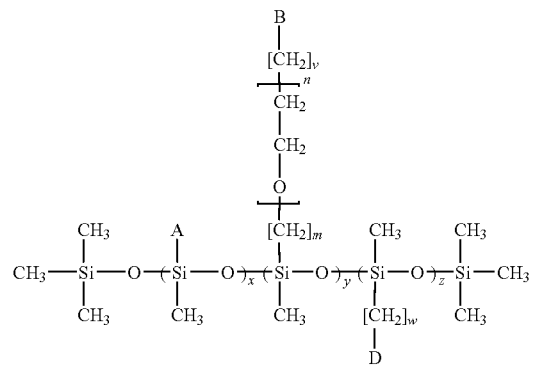

(1)

wherein A is selected from the group consisting of hydrogen, methyl, methoxy and functional polyethylene glycol based chains, B is a functional group for binding to a biologically-sensitive material, D is a functional group for, covalently or non-covalently, binding to a substrate, m is from 3 to 5, v is from 0 to 5, w is from 4 to 11, x is from 0 to 35 and z is from 1 to 33. In order to be soluble the functional PEG-grafted polysiloxane polymer fulfills the following conditions:

x+y+z is from 8 to 40,
n is from 8 to 30, and
y is from 7 and 35.

An advantage of the polymer according to the first aspect is that it is water soluble and therefore can be prepared in and deposited from an aqueous solution. Up until now, such functional PEG grafted polysiloxane polymers had to be prepared in and deposited from a toluene solution. As toluene is a toxic solvent, it should be avoided when bio-related applications are considered.

Furthermore, when the functional PEG-grafted polysiloxane polymer chemisorbs or covalently binds to a substrate, the PEG chains prefer to stay in the aqueous phase, while the polysiloxane backbones prefer to stay close to the surface of the substrate. This preferentially leads to a structure that is PEG enriched at the outmost surface. Consequently, nonspecific adsorption on the polymeric layer, preferably monolayer, will decrease, while the specific binding of the biologically-sensitive materials increases.

Moreover, because of this type of structure, the functional PEG-grafted polysiloxane polymer according to preferred embodiments does not suffer from phase separation as observed in mixed alkane thiol SAMs.

The stability of the functional PEG grafted polysiloxane polymer according to the first aspect is improved due to the D groups, which are groups that can interact with the substrate and which can form multiple D-substrate bonds.

According to embodiments of the first aspect, the number of the repetitive ethylene oxide units in the oligo(ethylene glycol) chain, n, can be higher than 8. In other embodiments, n can be higher than 10, preferably from 10 to 30, more preferably from 10 to 25 and most preferably from 12 to 35.

In embodiments of the first aspect, A can be a PEG like chain having general formula —$(CH_2)_{m1}$—(O—$CH_2$—$CH_2)_{n1}$—$(CH_2)_{v1}$—R wherein x can be from 0 to 35. In these embodiments m1 is preferably from 3 to 5, n1 is preferably from 3 to 25 and v1 is preferably be from 1 to 3. An advantage of these embodiments is that different functionalities can be added to one functional PEG-grafted polysiloxane polymer in order to bind different biomolecules at the same time. In these embodiments, the chance for phase separation of the different PEG components is still limited because these two, or even more, PEG components are grafted on one polysiloxane backbone and the relative mobility of these PEG side chains has been confined.

In other embodiments of the first aspect, A can be a hydrogen, a methyl or a methoxy group and n can be from 0 to 25.

According to embodiments of the first aspect, B can be selected from the group consisting of a carboxyl group, an amino group, an aldehyde, a sulfohydryl, a hydroxyl group, a maleimide, a nitriloacetic acid, a haloacetyl, a cyano, a hydrazide, a epoxy, a aziridine, a sulfonylchloride, a trifluoromethyldiaziridine, a pyridylsulfide, a N-acetyl-imidazole, a vinylsulfone, a arylazide, a diazoacetate, a benzophenone, a isothiocyanate, a isocyanate, a imidoester, a fluorobenzene, a phenyl, a benzenesulfonamide, a dinitrophenyl, a triphenymethyl, a hydroquinone, a biotin or a short peptide, i.e. a peptide comprising from 2 to 10 amino acids, such as e.g. a Gly-Arg-Gly-Asp (GRGD) peptide. Preferably, B may be one of a carboxyl group, an amino group, an aldehyde, a biotin, a maleimide, or a short peptide such as, e.g., a GRGD peptide.

In embodiments of the first aspect, D can be selected from the group consisting of $CH_3—CH_2—S—S—$, a 5-(1,2-dithiolan-3-yl)pentanoic acid ester or a cyclic disulfide within a 5-membered ring with general formula:

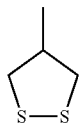

(3)

Preferably, D is $CH_3—CH_2—S—S—$ or a 5-(1,2-dithiolan-3-yl)pentanoic acid ester. In this case, compared to the polymeric layer, preferably a monolayer, prepared from the toluene solution of the polymer according to the prior art, the stability can be further improved by preparing the polymeric layer, preferably a monolayer, from an aqueous solution which comprises the functional PEG grafted polysiloxane polymer. This is because the desorption of the sulphur from the substrate is limited in aqueous compared to organic solvents such as, for example, toluene.

In other embodiments of the first aspect, D can be TT'T"Si-group, a TT'RSi-group or a TRR'Si-group wherein T, T' and T" are methoxy or ethoxy groups and R and R' are alkyl groups with formula $—(CH_2)n'-CH_3$ with n' from 0 to 3.

According to embodiments of the first aspect, z can preferably be from 1 to 30, more preferably z is from 5 to 30 and most preferably z is from 5 to 8.

In embodiments according to the first aspect, v is preferably from 1 to 3.

In a second aspect, a method is provided for the synthesis of a functional PEG-grafted polysiloxane polymer having a polysiloxane backbone and polyethylene glycol side chains, the polymer having the general formula:

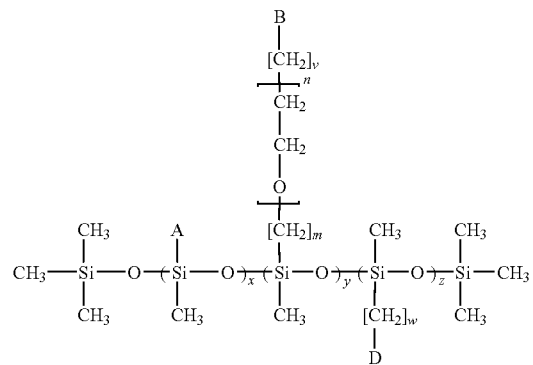

(1)

wherein A is selected from the group consisting of hydrogen, methyl, methoxy, and functional polyethylene glycol based chains, B is a functional group capable of binding to a biologically-sensitive material, D is a functional group capable of, covalently or non-covalently, binding to a substrate, m is from 3 to 5, v is from 0 to 5, w is from 4 to 11, x is from 0 to 35, and z is from 1 to 33.

The method according to the second aspect comprises:
providing an allyl terminated hydrocarbon comprising a terminal functional D group having the general formula:

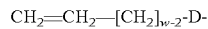

providing an allyl terminated polyethylene glycol or PEG polymer chain with a functional end group R and having the general formula:

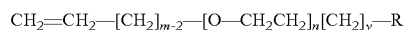

grafting said allyl terminated hydrocarbon comprising the terminal functional group D and said allyl terminated PEG polymer chain onto a polysiloxane backbone having the general formula:

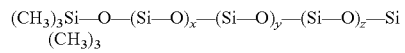

characterised in that the above steps are performed in aqueous solution and in that:
x+y+z is from 8 to 40,
n is from 8 to 30, and
y is from 7 to 35.

An advantage of the method according to the second aspect is that the functional PEG grafted polysiloxane polymer according to the first aspect is deposited from an aqueous solution. Up until now, such functional PEG grafted polysiloxane polymers had to be prepared in and deposited from a toluene solution. As toluene is a toxic solvent, it should be avoided when bio-related applications are considered.

According to embodiments of the second aspect, the allyl terminated hydrocarbon and the allyl terminated PEG polymer chain can be grafted onto the polysiloxane backbone by means of a one-step process, i.e., the allyl terminated hydrocarbon and the allyl terminated PEG polymer chain can be simultaneously grafted onto the polysiloxane backbone.

In other embodiments of the second aspect, the allyl terminated hydrocarbon and the allyl terminated PEG polymer chain can be grafted onto the polysiloxane backbone by means of a two-step process, i.e., the allyl terminated hydrocarbon and the allyl terminated PEG polymer chain can be subsequently grafted onto the polysiloxane backbone.

Preferably, grafting the allyl terminated hydrocarbon and the allyl terminated PEG chain onto the polysiloxane backbone can be performed by means of the one-step process. This is because, in the case of the one-step process, the controllability of the synthesis, for example, the ratio between the D groups and B groups is better than in the two-step process.

In embodiments according to the second aspect, the functional R group can be a functional group suitable for binding to a biologically-sensitive material and can be selected from the group consisting of a carboxyl group, an amino group, an aldehyde, a sulfohydryl, a maleimide, a nitriloacetic acid, a haloacetyl, a cyano, a hydrazide, an epoxy, an aziridine, a sulfonylchloride, a trifluoromethyldiaziridine, a pyridylsulfide, a N-acetyl-imidazole, a vinylsulfone, an arylazide, a diazoacetate, a benzophenone, a isothiocyanate, an isocyanate, an imidoester, a fluorobenzene, a phenyl, a benzenesulfonamide, a dinitrophenyl, a triphenylmethyl, a hydroquinone, a biotin or a short peptide, for example, a peptide comprising from 2 to 10 amino acids, such as, e.g., a Gly-Arg-Gly-Asp (GRGD) peptide.

In other embodiments according to the second aspect, the functional end group R can be a protected functional group and can be selected from the group consisting of a protected carboxyl group, a protected amino group, a protected aldehyde or a protected sulfohydryl. According to these embodiments, the method can furthermore comprise a de-protection step for activating said protected functional group.

In still further embodiments of the second aspect, the functional end group R can be a protected hydroxyl group. In these embodiments, the method can furthermore comprise a converting step for converting the protected hydroxyl group into a functional end group which is able to interact with biologically-sensitive materials.

In a third aspect, a method is provided for the deposition of a functional PEG-grafted polysiloxane polymer onto a substrate, the polymer comprising a polysiloxane backbone and functional polyethylene glycol side chains and having the general formula:

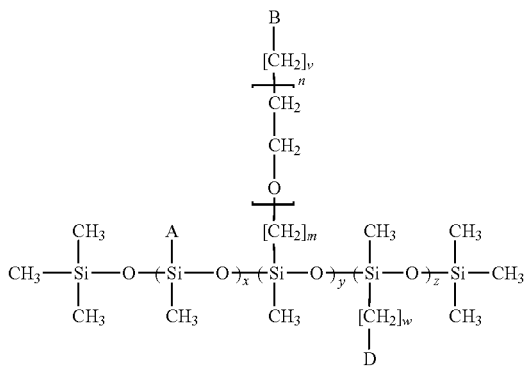

(1)

wherein A is selected from the group consisting of hydrogen, methyl, methoxy, and functional polyethylene glycol based chains, B is a functional group capable of binding to a biologically-sensitive material, D is a functional group capable of, covalently or non-covalently, binding to a substrate, m is from 3 to 5, v is from 0 to 5, w is from 4 to 11, x is from 0 to 35, and z is from 1 to 33.

The method comprises immersing the substrate in an aqueous solution comprising the functional polyethylene glycol-grafted polymer wherein said functional polyethylene glycol-grafted polymer is further defined by:
x+y+z is from 8 to 40,
n is from 8 to 30, and
y is from 7 to 35.

In embodiments of the third aspect, the aqueous solution can comprise from 0.1 mM to 5 mM of the functional polyethylene glycol or PEG-grafted polymer.

In embodiments of the third aspect, a patterned functional polyethylene glycol-grafted polysiloxane polymer is formed on the substrate. In this case, the method may furthermore comprise:

(a) before the immersion step: depositing a photoresist onto the substrate,
patterning the photoresist to form a patterned photoresist on top of the substrate, the substrate thus comprising photoresist-protected substrate area and exposed substrate area, and
(b) after said immersion step:
rinsing said substrate with an organic solvent for removing the patterned photoresist and the functional PEG-grafted polysiloxane polymer at the photoresist-protected area of the substrate.

Patterning the photoresist can, according to embodiments of fourth aspect of the invention, be performed by transferring the photoresist from a designed photolithographic mask by UV illumination and development.

According to embodiments of the third aspect, the immersion step can be performed over a period of up to 24 hours.

According to the third aspect, the substrate can be selected from the group consisting of gold, silver, platinum, copper, GaAs, silicon, glass, silica, quartz or metal oxide. In the case of the substrate being a metal oxide, the substrate can be selected from the group consisting of silicon oxide, indium tin oxide, magnesium oxide, titanium oxide, tantalum oxide, zirconium oxide, niobium oxide, palladium oxide, platinum oxide or ruthenium oxide.

In a fourth aspect, a biosensor is provided comprising a substrate comprising a layer, preferably a monolayer of a water soluble functional PEG-grafted polysiloxane polymer, the polymer comprising a polysiloxane backbone and PEG side chains and having the general formula:

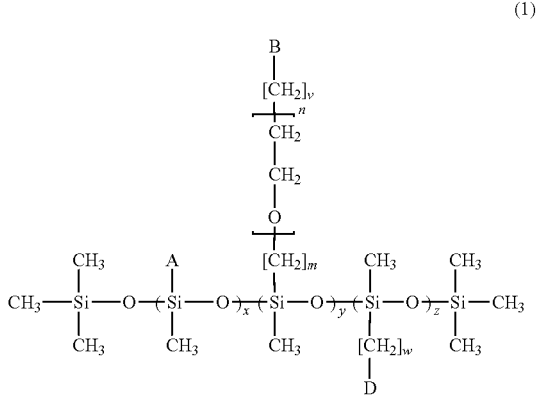

(1)

wherein A is selected from the group consisting of hydrogen, methyl, methoxy, and functional polyethylene glycol based chains, B is a functional group capable of binding to a biologically-sensitive material, D is a functional group capable of, covalently or non-covalently, binding to a substrate, m is from 3 to 5, v is from 0 to 5, w is from 4 to 11, x is from 0 to 35, and z is from 1 to 33. In order to be soluble, the functional PEG-grafted polysiloxane polymer preferably fulfills the following conditions:
x+y+z is from 8 to 40,
n is from 8 to 30, and
y is from 7 to 35.

According to embodiments of the fourth aspect y can be higher than 8.

According to embodiments of the fourth aspect, n can be from 10 to 25.

According to embodiments of the fourth aspect, m can be 3 or 4.

According to embodiments of the fourth aspect, w can be from 5 to 11.

Particular and preferred aspects of the preferred embodiments are set out in the accompanying independent and dependent claims. Features from the dependent claims may be combined with features of the independent claims and with features of other dependent claims as appropriate and not merely as explicitly set out in the claims.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
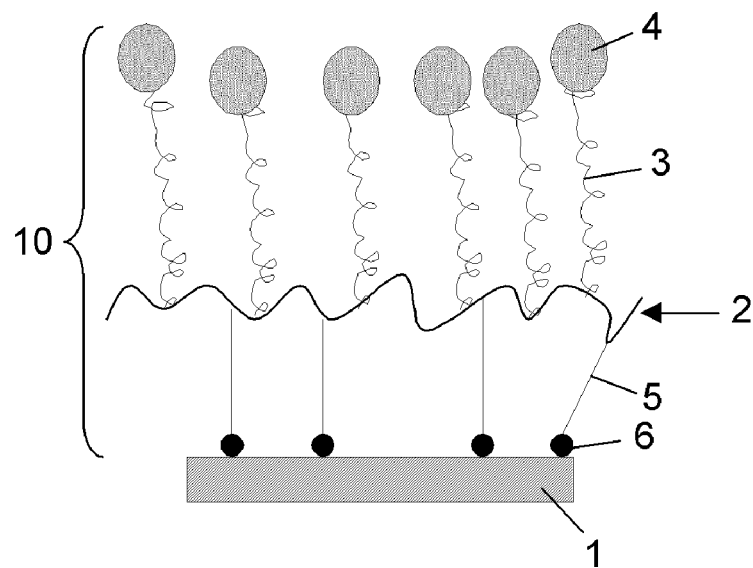
FIG. 1 is a schematic illustration of the structure of a PEG-grafted polysiloxane polymer on a substrate.

In the different figures, the same reference signs refer to the same or analogous elements.

DETAILED DESCRIPTION OF THE PREFERRED EMBODIMENT

The term biologically-sensitive materials as used herein, unless stated otherwise, refers to a suitable material which can bind to the polymer of this invention and can bind to a target molecule present in an analyte to be analysed. They may be, but are not limited to, nucleic acid strands (DNA, PNA, RNA), cell bodies, cell membrane components, proteins, hormones, antibiotics, antibodies, chemically or enzymatically modified antibodies, VHH fragments of antibodies, synthetic receptors, single chain Fv's, antigens, enzymes, or drugs.

The term target molecule as used herein, unless stated otherwise, refers to a molecule to be detected or determined in an analyte which can interact or bind with a biologically-sensitive material present on the polymer of this invention. The target molecules can be complementary nucleic acid strands (DNA, PNA, RNA), proteins, hormones, antibiotics, antibodies, antigens, enzymes, drugs.

The term biosensor as used herein, unless stated otherwise, refers to a device that uses an immobilized biologically-sensitive material (such as an enzyme, antibiotic, organelle or whole cell) to detect or measure a target molecule present in an analyte. A reaction between the immobilized biologically-sensitive material and the target molecule being analysed is transduced into an electric signal.

The term chemisorption as used herein, unless stated otherwise, refers to the binding of a functional group of the polymer of the invention to a by forces whose energy levels approximate those of a chemical bond.

The term protected group as used herein, unless stated otherwise, refers to a group that is attached to the polymer molecule and which needs to be activated before it can bind to a biologically-sensitive material.

The term activated group as used herein, unless stated otherwise, refers to a group that, after de-protection, can interact or bind to a biologically-sensitive material.

The term short peptide as used herein, unless stated otherwise, refers to a peptide comprising from 2 to 10 amino acids.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof.

The invention will now be described by a detailed description of several embodiments of the invention. It is clear that other embodiments of the invention can be configured according to the knowledge of persons skilled in the art without departing from the true spirit or technical teaching of the invention.

In a first aspect, a water-soluble functional polyethylene glycol or PEG-grafted polysiloxane polymer 10 is provided which can be deposited onto a substrate 1 to form a homogeneous polymeric layer, preferably a homogeneous monolayer. The water soluble functional PEG-grafted polysiloxane polymer 10, of which the structure is schematically illustrated in FIG. 1, comprises a polysiloxane backbone 2 with PEG chains 3 grafted thereon. The PEG chains 3 comprise functional groups 4 for interacting with biologically-sensitive materials which then can be used for detecting target molecules in analytes. The water-soluble functional PEG-grafted polysiloxane polymer 10 furthermore comprises hydrocarbon chains 5 comprising functional groups 6 suitable for binding or absorbing onto the substrate 1.

The substrate can, for example, comprise gold, silver, platinum, copper, GaAs, or any other suitable substrate, such as silicon, glass, silica, quartz, metal oxide an the like. Metal oxide can, for example, be silicon oxide, indium tin oxide, magnesium oxide, titanium oxide, tantalum oxide, zirconium oxide, niobium oxide, palladium oxide, platinum oxide or ruthenium oxide. The substrate can be modified to obtain reactive groups so that the functional PEG grafted polysiloxane polymer can bind onto the substrate. The substrate can be in the form of an optical fiber, a wire, a wafer, a disc, a planar surface or a bead. The substrate can also be a part of a sensor, e.g. a biosensor, a DNA chip, a protein chip, a micro-array or a microelectronic surface. The substrate can also be a part of a transducer, which can be, but is not limited to, a surface plasmon resonance sensor, a surface acoustic wave sensor, a quartz crystal microbalance, an amperometric sensor, a capacitive sensor, an interdigitated electrode or a chemFET sensor.

The water-soluble functional PEG-grafted polysiloxane polymer according to the first aspect comprises a polysiloxane backbone and polyethylene glycol or PEG based side chains and has the general formula:

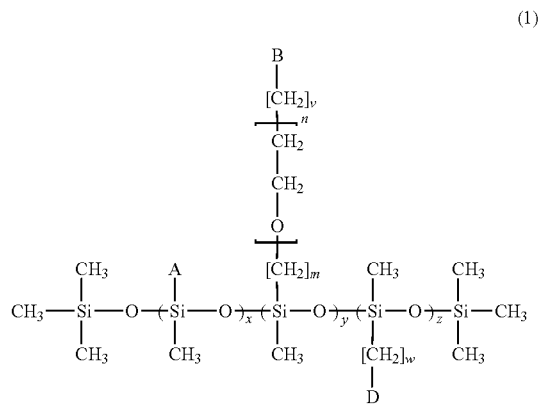

(1)

The polysiloxane backbone has a general formula $(CH_3)_3Si-O-(Si-O)_x-(Si-O)_y-(Si-O)_z-Si(CH_3)_3$. According to the preferred embodiments and to ensure the water solubility of the functional PEG-grafted polysiloxane polymer, the total repeated units in the polysiloxane backbone, which is determined by $x+y+z$, is preferably from 8 to 40.

The polysiloxane backbone is grafted with oligo(ethylene glycol) or PEG chains with a general formula $-(O-CH_2-CH_2)_n-$. The oligo(ethylene glycol) chain decreases non-specific adsorption of biologically-sensitive materials onto the surface of the substrate on which the PEG-grafted polysiloxane polymer is deposited. In this general formula, n is the number of the repetitive ethylene oxide units in the oligo (ethylene glycol) chain. To ensure the water solubility of the PEG-grafted polysiloxane polymer according to the preferred embodiments, n is preferably higher than 8, more preferably from 8 to 30. Preferably, n is higher than 10. When n is lower than 10, the PEG-grafted polysiloxane polymer may still be water soluble, but when the PEG-grafted polysiloxane polymer is used as, e.g., an interface layer for use in a biosensor, the performance of the biosensor may be less good than for a PEG-grafted polysiloxane polymer in which n is higher than 10. More preferably, n is from 10 to 30, most preferably n is from 12 to 25. The amount of the oligo(ethylene glycol) chains can be adjusted by varying the value of y. To ensure the water solubility of the PEG-grafted polysiloxane polymer, y is preferably from 7 to 35.

The oligo(ethylene glycol) chains are attached to the polysiloxane backbone by an alkyl chain with general formula $-(CH_2)_m-$. In this alkyl chain, m is preferably from 3 to 5. The alkyl chain $-(CH_2)_m-$ can optionally be interrupted by p heteroatoms in which p may be such that m+p is from 3 to 5. At the side of the PEG chain away from the polysiloxane backbone, an alkyl chain $-(CH_2)_v-$ is attached to the oligo(ethylene glycol) chain for connecting the oligo(ethylene glycol) chain with the functional end group B. In the alkyl chain $-(CH_2)_v-$, v is the number of repetitive methylene units and can be any number from 0 to 5. Preferably, v is from 1 to 3. The alkyl chain $-(CH_2)_v-$ can optionally be interrupted by q heteroatoms with q being such that v+q is from 0 to 5.

When the PEG-grafted polysiloxane polymer is deposited onto a substrate and serves, e.g., as an interface in a biosensor, the functional end group B is preferably suitable for interacting with biologically-sensitive materials. B can be either a hydroxy or methoxy group, or can be a highly reactive functional moiety that can bind to biologically-sensitive materials. An important restriction for the B group is that it is compatible with layer, preferably a monolayer, formation. Such possibilities for a highly reactive functional B group include, but are not limited to, protected or activated carboxyl groups, protected or activated amino groups, protected or activated aldehydes, protected sulfohydryl, maleimide, nitriloacetic acid, haloacetyl, cyano, hydrazide, epoxy, aziridine, sulfonylchloride, trifluoromethyldiaziridine, pyridylsulfide, N-acetyl-imidazole, vinylsulfone, arylazide, diazoacetate, benzophenone, isothiocyanate, isocyanate, imidoester, fluorobenzene, phenyl, benzenesulfonamide, dinitrophenyl, triphenymethyl, hydroquinone, biotin, and short peptides, e.g., Gly-Arg-Gly-Asp (GRGD) peptide. Preferably, B can be a protected or activated carboxyl group, a protected or activated amino group, a protected or activated aldehyde, biotin, maleimide, or a GRGD peptide. The biologically-sensitive materials that are able to interact/bind with the B groups can be, but are not limited to, nucleic acid strands (DNA, PNA, RNA), cell body, membrane component, proteins, hormones, antibiotics, antibodies, chemically or enzymatically modified antibodies, VHH fragments of camel antibodies, synthetic receptors, single chain Fv's, antigens, enzymes, or drugs.

In general, when the functional PEG-grafted polysiloxane polymer is used as a functional layer in a sensor, e.g., biosensor, the biological moieties serve as biological sensing elements and are part of the sensor. The resulting sensor is suitable for determining the presence of a compound, such as a target molecule, which interacts with the biological sensing element. The target molecules can be, but are not limited to, complementary nucleic acid strands (DNA, PNA, RNA), proteins, hormones, antibiotics, antibodies, antigens, enzymes, drugs, drugs of abuse, or molecules such as specific molecules present in for example gases and liquids.

In the general formula (1) of the PEG-grafted polysiloxane polymer according to the preferred embodiments, the A group can, according to some embodiments, be a hydrogen, a methoxy group, or a methyl group. In that case, the value of x is preferably from 0 to 25. In other embodiments, where it is desired to provide a functional PEG-grafted polysiloxane polymer having different functional groups which can interact with different biomolecules at the same time, the A group can be a PEG chain with formula $-(CH_2)_{m1}-(O-CH_2-CH_2)_{n1}-(CH_2)_{v1}-R$, wherein R is a functional group preferably different from the functional group B. In this case, x is preferably from 0 to 35. In this formula, $-(CH_2)_{m1}-$ is an alkyl chain connecting the oligo(ethylene glycol) chain with the polysiloxane backbone. m1 is preferably from 3 to 5. The alkyl chain $-(CH_2)_{m1}-$ can optionally be interrupted by p' heteroatoms, wherein p' is such that m1+p' is from 3 to 5. $-(CH_2)_{v1}-$ is an alkyl chain connecting the oligo(ethylene glycol) chain with a functional end group R. The R group can be any group described for functional end group B. As already discussed, R is preferably different from B in order to provide two different groups which can interact with two different biologically-sensitive materials and hence can serve for the detection of different target molecules at once. However, in certain embodiments, R can be the same as B. v1 is the number of repetitive methylene units and can be from 0 to 5. Preferably, v1 is from 1 to 3. The alkyl chain $(CH_2)_{v1}$ can optionally be interrupted by q' heteroatoms wherein q' is such that v1+q' is from 0 to 5. The number of repeated units of ethylene oxide, n1, can be from 3 to 25.

The functional PEG-grafted polysiloxane polymer furthermore comprises a D group which is suitable for chemisorbtion or covalently binding onto a substrate. The substrate can be any substrate as described above. preferably a gold, a platinum or a GaAs substrate. In the case of chemisorption, the substrate is preferably a gold, a platinum or a GaAs substrate and the D group is then preferably a disulfide such as, e.g., $CH_3-CH_2-S-S-$ or a 5-(1,2-dithiolan-3-yl)pentanoic acid ester with structural formula:

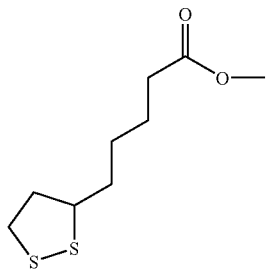

(2)

but can also be a cyclic disulfide within a 5-membered ring with structural formula:

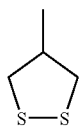

In other embodiments, the D group can covalently bind to a substrate. In that case, the substrate is preferably silicon, glass, silica, quartz or metal oxide and the D group can be a TT'T"—Si—, TT'RSi— or TRR'Si-functionality, wherein R can be an alkane with formula $-(CH_2)_n-CH_3$ wherein n can be from 0 to 3. In that case, the functional PEG-grafted polysiloxane polymer can have the formula:

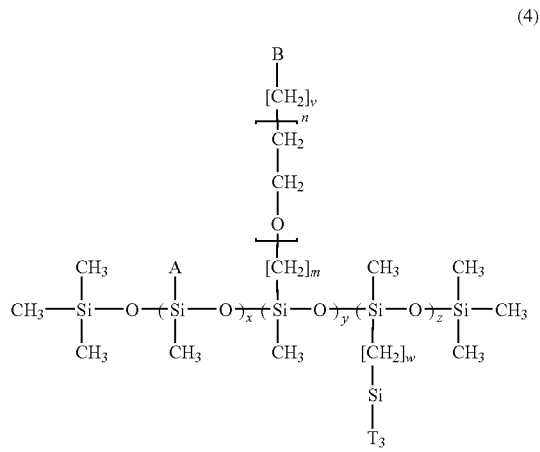

(4)

The T, T' and T" groups can be methoxy or ethoxy groups.

The amount of the D group can be adjusted by varying the value of z, and z can be any number from 1 to 33, preferably from 1 to 30. More preferably z can be from 5 to 30, most preferably z is from 5 to 8. $-(CH_2)_w-$ is an alkane chain, which enables the formation of an ordered layer, preferably a monolayer, film on the substrate surface. W is the number of repetitive methylene units in the alkane chain and can be any number from 4 to 11. The described alkane chain can be optionally interrupted by p heteroatoms wherein w+p can be any number from 4 to 11.

According to the first aspect, a functional PEG-grafted polysiloxane polymer can be made water-soluble by controlling its structure. In order to be water-soluble, the PEG-grafted polysiloxane polymer preferably fulfils the following conditions in the general chemical formula (1):
1) x+y+z is from 8 to 40,
2) n is from 8 to 30, and
3) y is from 7 to 35.

In case of biosensor applications, an aqueous solution is typically the best choice in the consideration of biocompatibility. In that case, a lot of bio-molecules can be integrated into the polymer as functional B groups, which thus significantly broadens the application of the functional PEG grafted polysiloxane polymer according to this first aspect.

Because it is water soluble, a polymeric layer, preferably monolayer, which is formed from the functional PEG grafted polysiloxane polymer, can also be deposited from an aqueous solution (see further). When the functional PEG grafted polysiloxane polymer is then deposited onto a substrate to form a polymeric layer, preferably monolayer, on that substrate, most of the PEG side chains together with the functional B groups are enriched at the outmost of the polymeric layer, preferably a monolayer. This is because of the solvent effect acting on both the polysiloxane backbone and the PEG side chains. When water is used as a solvent for the preparation of the functional PEG grafted polysiloxane polymer, the polysiloxane backbone tends to collapse because it is insoluble in water. At the same time, the PEG chain gives an extended conformation due to its strong hydration effect in water [Rixman, M. A.; Dean, D.; Ortiz, C., Langmuir 2003, 19, 9357]. The polysiloxane backbone and PEG side chains tend to phase separate due to the solvent effect [Zhan, Y. J.; Mattice, W. L. Macromolecules 1994, 27, 683]. As a consequence, when the whole polymer chemisorbs or covalently binds to the substrate, the PEG chains prefer to stay in the aqueous phase, while the polysiloxane backbones prefer to stay close to the surface of the substrate. This leads to a stratified structure that is PEG enriched at the outmost surface. Consequently, non-specific adsorption on the polymeric layer, preferably a monolayer, decreases, while the specific binding of the biologically-sensitive materials increases. Under these conditions, the A group can be simplified to hydrogen or a methoxy group. This means that, in its most simple form, the functional PEG grafted polysiloxane polymer only comprises two different components on the polysiloxane backbone, i.e., PEG side chains with a B functional group and alkane side chains containing functional groups suitable to chemisorb or covalently bind to the surface of the substrate. This significantly decreases the complexity of the synthesis of the polymer and enhances the controllability of the synthesis at the same time, compared to the design reported by Xia N. et al., in 'Langmuir 2002, 18, 3255'.

The density of the functional end groups B may be easily controlled by directly varying y during the synthesis of the functional PEG grafted polysiloxane polymer. As described above, the polymeric layer, preferably a monolayer, prepared from an aqueous solution has a stratified structure with PEG segments enriched at the outmost surface. For a polymeric layer, preferably monolayer, which is formed from the functional PEG grafted polysiloxane polymer, having such structure, the exposed functional group B can efficiently bind to biologically-sensitive materials and the bulk PEG segment can significantly decrease the non-specific adsorption. Thus, in this case, only one kind of PEG component is required in the polymeric layer, preferably a monolayer, for achieving the specific binding of biologically-sensitive materials and for preventing the non-specific adsorption at the same time. Because there is only one PEG-component needed, the synthesis of the functional PEG grafted polysiloxane polymer becomes more easily controllable compared to the polymer reported by Xia N. et al. In case of organothiol or organosilane SAMs, a mixed SAM, i.e., a second thiol or silane component has to be introduced in order to control the density of the functional group in the first or silane component. This complicates the surface modification procedure and sometimes this results in a layer with poor quality. Moreover, even if two different functional groups are present in the layer, using the functional PEG grafted polysiloxane polymers according to the first aspect, this can easily be fulfilled by grafting two PEG components onto the polysiloxane backbone, i.e., by replacing the A group by a PEG chain comprising a functional group. Even though it complicates the synthesis of the PEG grafted polysiloxane polymer, the film deposition step is still simple and controllable (see further). In contrast, to obtain two different functionalities through organothiol or organosilane SAMs, mixed SAMs have to be employed. However, attempts to prepare mixed SAMs either consist of complex surface modification procedures or result in non-uniform layer structures due to the phase separation problems inherent in mixed SAMs.

Functional PEG grafted polysiloxane polymers comprising two different PEG chains are employed in the preferred embodiments and show advantages with respect to the prior art polymers. Most importantly, for the functional PEG grafted polysiloxane polymer of preferred embodiments, there is no possibility for phase separation as observed in mixed alkane thiol SAMs. Even if two or more different PEG-components are employed in order to be able to bind different biomolecules at the same time, the chances of phase separation of the different PEG-components is still limited in case of the functional PEG grafted polysiloxane polymer according to the first aspect, because these two or more components are grafted on one polysiloxane backbone and the relative mobility of these PEG side chains has been confined.

As already discussed, the stability of organothiol SAMs is an issue of debate. Compared to alkane thiol or organothiol SAMs, the stability of the functional PEG grafted polysiloxane polymer according to the preferred embodiments is improved due to the D groups, which are groups that can interact and bind with the substrate, for example disulfide groups, and which form multiple D-substrate bonds [Sun, F. et al., J. Am. Chem. Soc. 1996, 118, 1856]. Moreover, in the specific example of D being a sulphur containing group, compared to the polymeric layer prepared from the toluene solution of the polymer, the stability can further be improved by preparing the polymeric layer, preferably a monolayer, from an aqueous solution which comprises the functional PEG grafted polysiloxane polymer. This is because the desorption of the sulfur from the substrate is limited in aqueous solutions compared to organic solvents such as toluene [Schlenoff J. B., Li M., and Ly H., in J. Am. Chem. Soc. 1995, 117, 12528].

In a second aspect, a method for the synthesis of the water soluble functional PEG grafted polysiloxane polymer of the first aspect of the invention is provided. The subsequent steps of the synthesis procedure are described hereinafter.

Step 1:

A first step in the synthesis of a water soluble functional PEG grafted polysiloxane polymer according to a preferred embodiment is the synthesis of an allyl terminated hydrocarbon chain comprising a D group having the general formula:

(5)

wherein the D group is capable of chemisorbing or covalently binding onto a substrate and is preferably a disulfide such as, e.g., $CH_3$—$CH_2$—S—S— or a 5-(1,2-dithiolan-3-yl)pentanoic acid ester with structural formula as formula (2), but can also be a cyclic disulfide within a 5-membered ring with a structural formula as formula (3). In other embodiments, the D group can covalently bind to a substrate. In that case, the D group can be a TT'T"—Si—, TT'RSi— or TRR'Si— functionality, wherein R and R' can be alkanes with formula —$(CH_2)_n$—$CH_3$ wherein n can be from 0 to 3. The T, T' and T" groups may be methoxy or ethoxy groups. Furthermore, according to the present invention, in formula (5), w can be from 4 to 11.

Hereinafter, three examples are described for the synthesis of the allyl terminated alkane. It will be understood by a person skilled in the art that these examples are not limiting.

Example 1

The Synthesis of 11-Ethyldithiol-1-undecene

Figure 2:
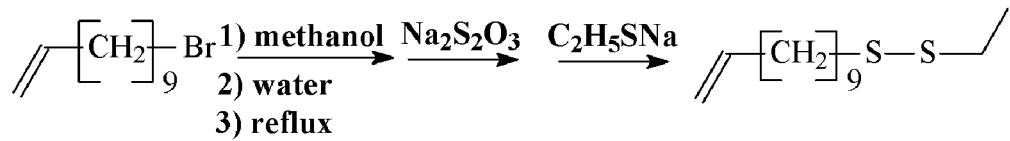
FIG. 2 is a schematic illustration of the synthesis of 11-ethyldithiol-1-undecene.

A schematic illustration of the synthesis of 11-Ethyldithiol-1-undecene is given in FIG. 2.

Method: 2.33 g 11-Bromo-1-undecene (Fluke) in 12 ml methanol was charged into a two-necked flask with condenser. 1 ml water was slowly added. Then the reaction solution was heated and refluxed. 3.102 g sodium thiosulphate pentahydrate ($Na_2S_2O_3.5H_2O$, Sigma) in 3 ml water was added slowly over 40 minutes. Reflux was maintained for another 4 hours. The reaction was then cooled down and the solvent is removed by rotary evaporation. Water was added to make a final volume of about 12 ml. The aqueous solution was extracted twice with hexane and the aqueous phase was thereafter collected. The collected aqueous solution was cooled down to 0° C. and 1.052 g sodium ethanethiolate ($C_2H_5SNa$, Fluka) dissolved in 1.3 ml water was added quickly. Next, 2 ml saline was added. After 10 minutes, the temperature was raised up to 5° C. The resulting solution was extracted with ether and the organic phase was collected. The solution was then dried over anhydrous $Mg_2SO_4$ and filtered. The solvent was removed and a final oil-like product was obtained. This oil-like product was purified by silica chromatography with hexane as an eluent.

Result: The product yield was 80%. $^1$H NMR (300 MH, $CDCl_3$): δ 1.28-1.34 (m, $(CH_2)_6CH_2S$, $SCH_2CH_3$), 1.67 (quint, $CH_2$=$CHCH_2CH_2$), 2.03, (quartet, $CH_2$=$CH$ $CH_2CH_2$), 2.66-2.72 (m, $CH_2SSCH_2CH_3$), 4.90-5.01 (m, $CH_2$=$CH$), 5.74-5.86 ($CH_2$=$CH$).

Example 2

The Synthesis of 4-pentenyl-1,2-dithiolane

Figure 3:
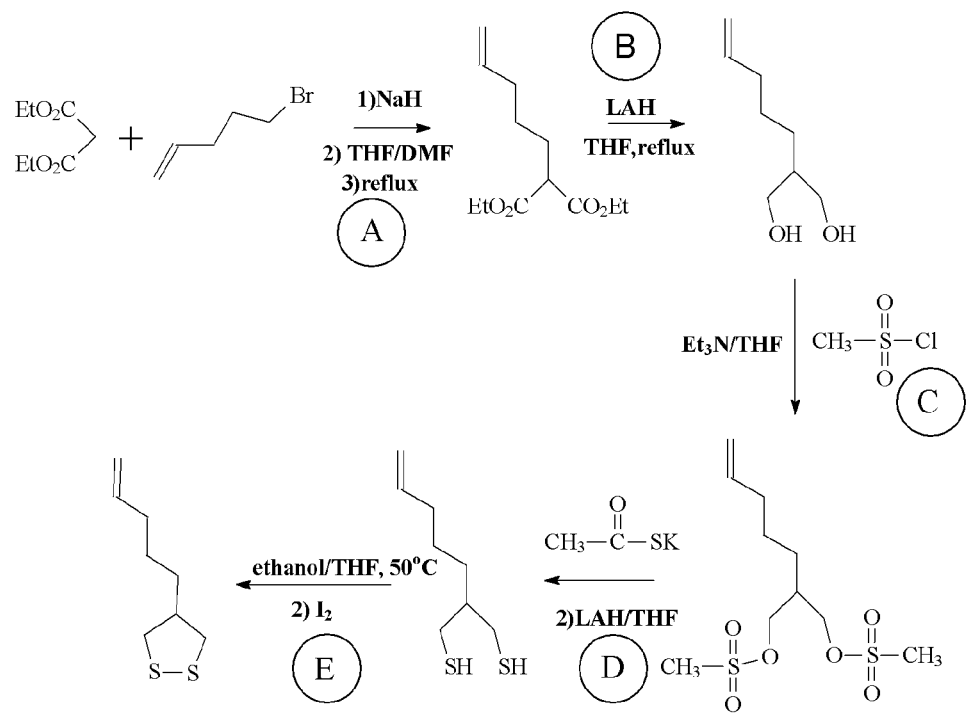
FIG. 3 is a schematic presentation of the synthesis of 4-pentenyl-1,2-dithiolane.

A schematic illustration of the synthesis of 4-pentenyl-1,2-dithiolane is given in FIG. 3.

Method:
1) The preparation of diethyl 2-pentenylmalonate (step A in FIG. 3): A solution of NaH (6.00 g, 150 mmol) in 250 ml dry tetrahydrofuran (THF) and 75 ml dimethyl formamide (DMF) was prepared at 0° C. in an argon atmosphere. To this solution, diethyl malonate (24.9 g, 150 mmol) was added slowly. The mixture was stirred for 15 minutes at room temperature. Then, 5-bromo-pentene (7.40 g, 50 mmol) was added and the mixture was heated up to reflux for 2 hours. The reaction mixture was concentrated by rotary evaporation and the resulting oil was suspended in 100 ml water. The mixture was first extracted twice with pentane and then once with a 1:1 mixture of pentane/diethyl ether. The organic layer was collected and washed by water three times and then dried over $MgSO_4$. Then, it was filtrated and the solvent was removed by rotary evaporation. The crude product was purified by vacuum distillation to afford pure diethyl 2-pentenylmalonate.
2) The preparation of 2-pentenylpropane-1,3-diol (step B in FIG. 3): Lithium aluminum hydride (LAH, 1.31 g, 34.6 mmol) was added to a solution of diester A (1.97 g, 8.66 mmol) in THF (100 ml) at room temperature and the reaction mixture was heated up to reflux for 2 hours. The reaction was quenched by the addition of 150 ml of 1M HCl solution and was stirred for 30 minutes. The aqueous layer was collected and extracted three times with diethyl ether. The organic phase was collected and washed by dilute HCl twice and brine once. Then it was dried with $MgSO_4$ and filtrated. The solvent was removed by rotary evaporation to get 2-pentenylpropane-1,3-diol.
3) The preparation of 2-pentenylpropane-1,3-dimesylate (step C in FIG. 3): A solution of diol B (1.13 g, 7.83 mmol) and triethylamine (1.98 g, 19.6 mmol) in THF (100 ml) was prepared. While stirring the solution 2.24 g (19.6 mmol) of methanesulfonyl chloride was added dropwise, spread over 5 minutes. After the addition of the methanesulfonyl, the solution was stirred for 2 hours. Ice-cold water (100 ml) was then poured into the reaction mixture to destroy any excess methanesulfonyl chloride. The aqueous layer was collected and extracted by dichloromethane three times.

The organic phase was collected and washed once with dilute HCl, once with water and twice with a $NaHCO_3$ solution. The organic layer was dried over $MgSO_4$ and filtrated. The solvent was removed to give the crude dimesylate.
4) The preparation of 2-pentenylpropane-1,3-dithiol (step D in FIG. 3): Potassium thioacetate (1.94 g, 17.0 mmol) and dimesylate C (2.04 g, 6.79 mmol) was put in 100 ml of EtOH under argon atmosphere and heated up to 70° C. for 6 hours. 100 ml water was then added and the mixture is extracted with diethyl ether three times. The organic phase was collected and washed with water three times and dried over $MgSO_4$. Then it was filtrated and the solvent is removed. The concentrated product was dissolved in THF, and then LAH (1.03 g, 27.2 mmol) was added at room temperature. The mixture was heated to reflux for 2 hours and was then quenched under argon atmosphere by adding 20 ml ethanol. After being stirred for 10 minutes, the mixture was acidified to pH 1 by addition of 1M HCl. The aqueous layer was then extracted with diethyl ether three times. The organic phase was collected and washed by dilute HCl solution twice and brine once. It was dried over $MgSO_4$ and filtrated. The solvent was removed by rotary evaporation and the crude product was obtained.
5) The preparation of 4-pentenyl-1,2-dithiolane (step E in FIG. 3): A solution of dithiol D (1.15 g, 5.60 mmol) in 200 ml ethanol and 100 ml THF was heated up to 50° C. The solution was stirred and iodine crystals are carefully added until a yellow-brown color is maintained. After obtaining the yellow-brown color, the reaction was kept at 50° C. for another 30 minutes. Afterwards, the solution was concentrated and the resulting oil was dissolved in 20 ml diethyl ether. This mixture was washed by water three times and dried over $MgSO_4$. Then it was filtrated and the solvent was removed by rotary evaporation. The crude product was purified by chromatography on silica gel using hexane as an eluent.

Example 3

The Synthesis of 4-pentenyl 5-(1,2-dithiolan-3-yl)pentanoate

Figure 4:
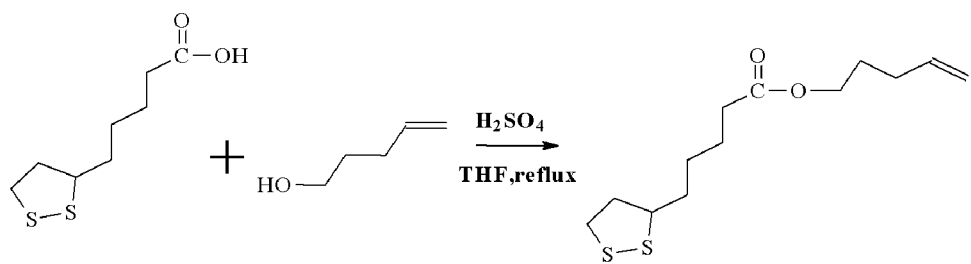
FIG. 4 is a schematic presentation of the synthesis of 4-pentenyl 5-(1,2-dithiolan-3-yl)pentanate.

A schematic illustration of the synthesis of 4-pentenyl 5-(1,2-dithiolan-3-yl)pentanoate is given in FIG. 4.

Method: 5-(1,2-dithiolan-3-yl)pentanoic acid (1.03 g, 5 mmol) and 4-pentenyl-1-ol (0.52 g, 6 mmol) were added into 50 ml THF and then 3-4 drops of concentrated $H_2SO_4$ were added. The mixture was heated to reflux for 12 hours. After cooling down to room temperature, a saturated $NaHCO_3$ solution was added to adjust the pH to 7. Then the mixture was filtrated and the solvent was removed. The concentrated product was dissolved in ethyl acetate and washed by water twice and brine once. The organic phase was collected and dried over $MgSO_4$. Then it was filtrated and the solvent was removed to get the crude product. The product was then purified by chromatography on silica gel with hexane as an eluent.

Step 2:
A second step in the synthesis of the water soluble functional PEG grafted polysiloxane polymer according to the first aspect of the invention is the synthesis of an allyl terminated PEG polymer with a functional end group suitable for interacting and binding with biologically-sensitive materials, such as, e.g., nucleic acid strands (DNA, PNA, RNA), cell body, membrane component, proteins, hormones, antibiotics, antibodies, chemically or enzymatically modified antibodies, VHH fragments of camel antibodies, synthetic receptors, single chain Fv's, antigens, enzymes, or drugs. The allyl terminated PEG polymer can also be called all-PEG chain and can have the following general formula:

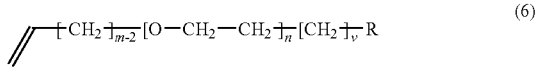

(6)

wherein m can be from 3 to 5, v can be from 0 to 5 and n is higher than 8 and is preferably from 8 to 30. Preferably n is higher than 10, more preferably n is from 10 to 30 and most preferably n is from 12 to 25. The alkyl chain —$(CH_2)_m$— can optionally be interrupted by p heteroatoms in which p—be such that m+p is from 3 to 5. The alkyl chain —$(CH_2)_v$— can optionally be interrupted by q heteroatoms with q being such that v+q is from 0 to 5.

There are three different possibilities preferred for the choice of the R group:
1) R can be already one of the functional groups, i.e., a B group, as defined in the first aspect. In that case, the R-group does not have to be activated in order to be able to bind biologically-sensitive materials.
2) R can be a protected B group because this B group itself is not compatible with the next step (see step 3) in the synthesis process of the functional PEG grafted polysiloxane polymer according to a preferred embodiment, i.e., a hydrosilation step. In that case, the protected group is activated in order to be able to bind biologically-sensitive materials.
3) R can be a protected hydroxyl group and can be converted to a functional group B after the hydrosilation step (step 3 of the synthesis process, see further).

The three different possibilities are respectively illustrated in Examples 4, 5 and 6.

Example 4

Figure 5:
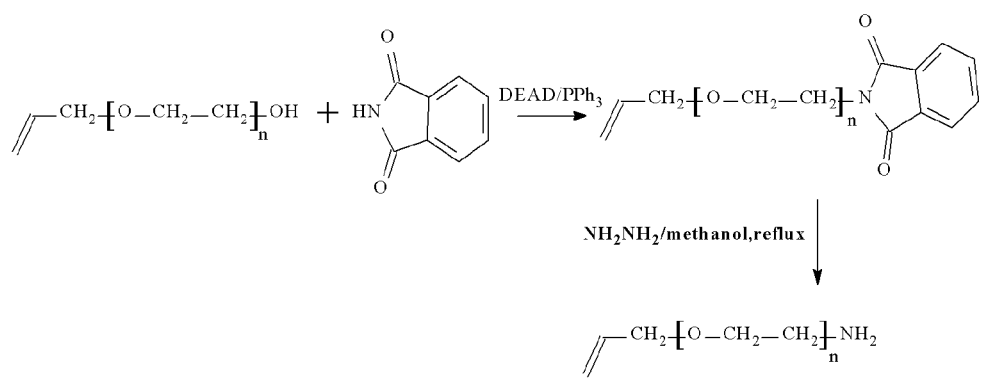
FIG. 5 is a schematic presentation of the synthesis of allyl terminated PEG with amino group.

The Synthesis of an Allyl Terminated PEG with an Amino Group, Wherein m=3, n=25, v=0, R=$NH_2$ A schematic illustration of the synthesis of an allyl terminated PEG with amino group (R=$NH_2$) is given in FIG. 5.

Method: 4.25 g (3.86 mmol) polyethylene glycol mono-allyl ether (Mw=1100) was dissolved in 5 ml dry THF and was added dropwise to a stirred solution of triphenylphosphine (1.17 g, 4.45 mmol) and phthalimide (0.662 g, 4.49 mmol) in 20 ml dry THF. At 0° C., diethyl azodicarboxylate (DEAD) (0.73 ml, 4.6 mmol) was added slowly and the reaction mixture was slowly heated up to room temperature and was then stirred for an additional 15 minutes. 2 ml $H_2O_2$ (30% v/v) was added to oxidise the remaining triphenylphosphine. The mixture was then extracted by dichloromethane and dried over $MgSO_4$. Then it was filtrated and the solvent was removed. The residue was dissolved in a minimum, i.e. less than 4 mL, of ethyl acetate, and hexane was added to precipitate the triphenylphosphine oxide. After filtration, the filtrate was concentrated to give the crude product. The crude product was then purified by chromatography on silica gel with 3:1 hexane:ethyl acetate as an eluent. The purified product (3.82 g, 3.47 mmol) was dissolved in 100 ml MeOH and hydrazine hydrate (3 ml, 59.4 mmol) is added. This mixture was degassed by two freeze-pump-thaw cycles and then heated up to reflux for 3 hours. When cooled down, the precipitate was removed by filtration. The filtrate was concentrated and extracted with $CHCl_3$ three times. Then it was dried over $MgSO_4$ and filtrated. After concentrating, the crude product was purified by chromatography on silica gel with 10% methanol/3% triethylamine/87% ethyl acetate as eluent.

Example 5

Figure 6:
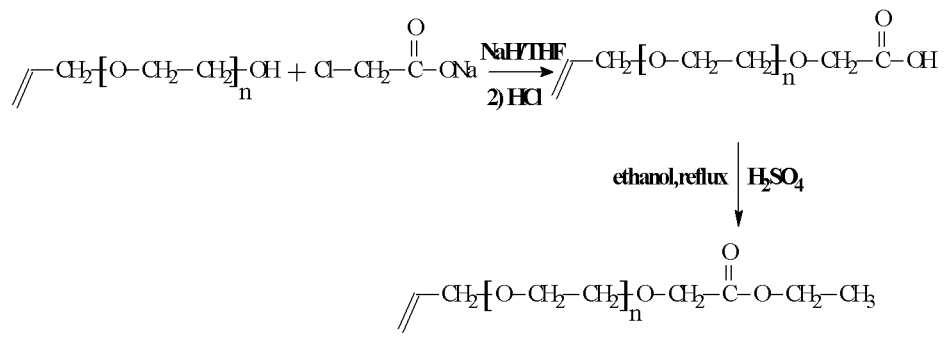
FIG. 6 is a schematic presentation of the synthesis of allyl terminated PEG with protected carboxy group.

The Synthesis of Allyl Terminated PEG with Protected Carboxyl Group, Wherein m=3, n=25, p=1, v=1, R=$COOCH_2CH_3$ A schematic illustration of the synthesis of an allyl terminated PEG with protected carboxyl group (R=$COOCH_2CH_3$) is given in FIG. 6.

Method:
1) The preparation of an allyl terminated PEG with a carboxyl group: 4.4 g (4 mmol) polyethylene glycol mono-allyl ether (Mw=1100) was dissolved in 250 ml dry THF in an argon atmosphere. 0.332 g (8.3 mmol) NaH (60%) was added. Then the reaction mixture was stirred for 24 hours at room temperature, 0.827 g (6.9 mmol) sodium salt of chloroacetic acid was then added and the reaction mixture was heated to reflux for 72 hours. After cooling down to room temperature, the pH of the mixture was adjusted to 1 by adding a 5M HCl solution. The precipitate was removed by filtration and the solution was concentrated. The concentrated product was then dissolved in 20 ml 1M HCl and then extracted by $CHCl_3$ three times. It was dried over $MgSO_4$ and filtrated. The solvent was removed and the crude product was purified by repetitive precipitation/dissolvation in hexane/toluene.
2) The preparation of an allyl terminated PEG with protected carboxyl group. 4.2 g (3.8 mmol) of the allyl terminated PEG with a carboxyl group prepared in 1) was dissolved in 50 ml ethanol. Three drops of concentrated $H_2SO_4$ were added and the reaction mixture was heated to reflux for 6 hours. After cooling down, a saturated $NaHCO_3$ solution was added in order to adjust the pH to 7. The mixture was filtrated and the solvent was removed. The concentrated product was dissolved in $CHCl_3$ and washed by water twice and brine twice. Then it was dried over $MgSO_4$ and filtrated. The solvent was removed by rotary evaporation. The crude product was purified by repetitive precipitation/dissolvation in hexane/toluene.

Result:
1) For the allyl terminated PEG with carboxyl group, the product yield was 96%. $^1$H NMR (CDCl3) δ 3.63 (O $CH_2CH_2$), 4.01 ($CH_2$=CH—$CH_2$—O), 4.17 (C $\overline{H2}$-COOH), 5.15-5.30 ($CH_2$=CH—), 5.85-5.98 ($CH_2$=C $\overline{H}$—).
2) For the allyl terminated PEG with protected carboxyl group, the product yield was 98%. $^1$H NMR (CDCl3) δ 1.26-1.31 (COO—CH2-CH3) 3.63 ($OCH_2CH_2$), 4.01 ($CH_2$=CH—$CH_2$—O), 4.17 (CH2—$\overline{COO}$CH2CH3), 4.20-4.25 ($\overline{COO}$—CH2-CH3), 5.15-5.30 ($CH_2$=CH—), 5.85-5.98 (CH2=CH—).

Example 6

Figure 7:
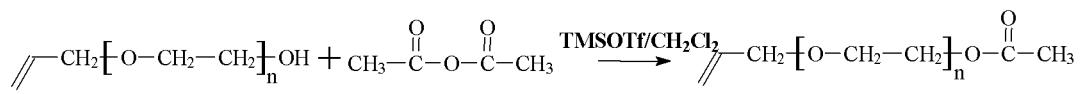
FIG. 7 is a schematic presentation of the synthesis of allyl terminated PEG with protected hydroxy group.

The Synthesis of an Allyl Terminated PEG with a Protected Hydroxyl Group, Where m=3, n=25, v=0, R=O—$COCH_2CH_3$ A schematic illustration of the synthesis of an allyl terminated PEG with protected hydroxyl group (R=O—$COCH_2CH_3$) is given in FIG. 7.

Method: 1.1 g (1 mmol) polyethylene glycol mono-allyl ether (Mw=1100) was dissolved in 2 ml $CH_2Cl_2$. 0.153 g (1.5 mmol) acetic anhydride ($Ac_2O$) was added at 0° C., then a 20 μl $CH_2Cl_2$ solution of trimethylsilyl trifluoromethane-sulfonate (TMSOTf) (1M) was added. After reaction for 2 hours, 0.016 g (0.5 mmol) $CH_3OH$ was added to exhaust the excess $Ac_2O$, $NaHCO_3$ solution was then added to adjust the pH of the reaction mixture to 7. The organic layer was collected and washed with water three times and dried over $MgSO_4$. The solvent was removed by rotary evaporation at or below 40° C. to obtain the pure product.

Step 3:

A third step in the synthesis of the water soluble functional PEG grafted polysiloxane polymer according to the first aspect is the synthesis of the polysiloxane polymer with grafted functional PEG side chains and a hydrocarbon chain with a functional group suitable to chemisorb or covalently bind to the surface of the substrate.

Figure 8:
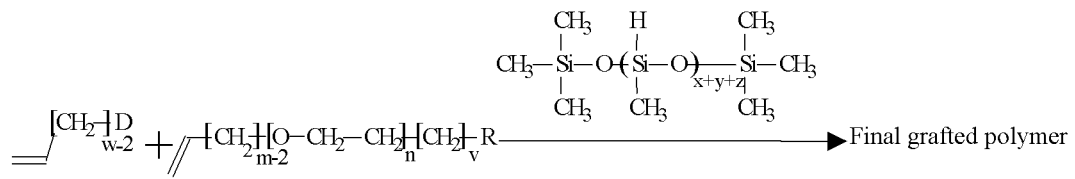
FIG. 8 is a schematic presentation of the one step hydrosilation.
Figure 9:
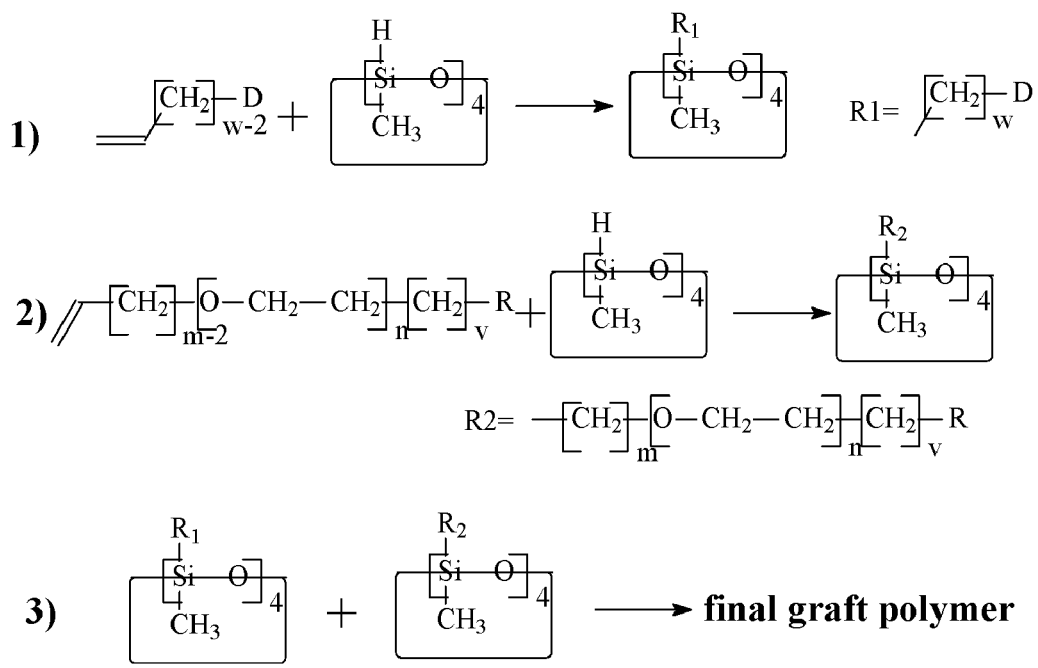
FIG. 9 is a schematic presentation of the two steps hydrosilation.

There are two preferred ways to conduct this last step:
a) One step hydrosilation: the allyl terminated hydrocarbon chain comprising a D group as prepared in the first step of the synthesis of the functional PEG grafted polysiloxane polymer according to a preferred embodiment and the allyl terminated PEG chains comprising a functional group B as prepared in step 2 of the synthesis of the functional PEG grafted polysiloxane polymer according to a preferred embodiment are simultaneously grafted onto a polysiloxane polymer, in the example given, a poly(methylhydrosiloxane) polymer, through a hydrosilation reaction. This one step hydrosilation is illustrated in FIG. 8.
b) Two step hydrosilation: in a first step, the allyl terminated hydrocarbon chains comprising a D group as prepared in the first step of the synthesis of the functional PEG grafted polysiloxane polymer according to a preferred embodiment are grafted onto a polysiloxane polymer, in the example given, a tetramethylcyclotetrasiloxane (D4H), by hydrosilation to form D4-functional group D. In a second step, the allyl-terminated PEG chains as prepared in step 2 of the synthesis of the functional PEG grafted polysiloxane polymer according to a preferred embodiment are grafted onto D4H by hydrosilation to make PEG grafted D4H (denoted as D4-PEG). Finally, the D4-functional group D and D4-PEG are polymerized to form the water soluble functional PEG grafted polysiloxane polymer. The two step hydrosilation process is illustrated in FIG. 9.

In most cases, the first way, i.e., the one-step process is preferred. This is because, in case of the one-step process, the controllability of the synthesis, for example the ratio between the D groups and B groups, is better than in the two-step process. Hereinafter, two examples (Example 7 and 8) are given for the functional PEG grafted polysiloxane polymer prepared by the one step process. In Example 7, the polysiloxane polymer may be grafted with only one kind of PEG chains, i.e., the PEG grafted polysiloxane polymer only comprises one kind of functional groups interacting with biologically-sensitive materials, while in Example 8 two kinds of PEG chains, each kind having different functional groups, can be grafted onto the polysiloxane polymer.

Example 7

The Synthesis of Functional PEG Grafted Polysiloxane Polymer 10, Having a Formula

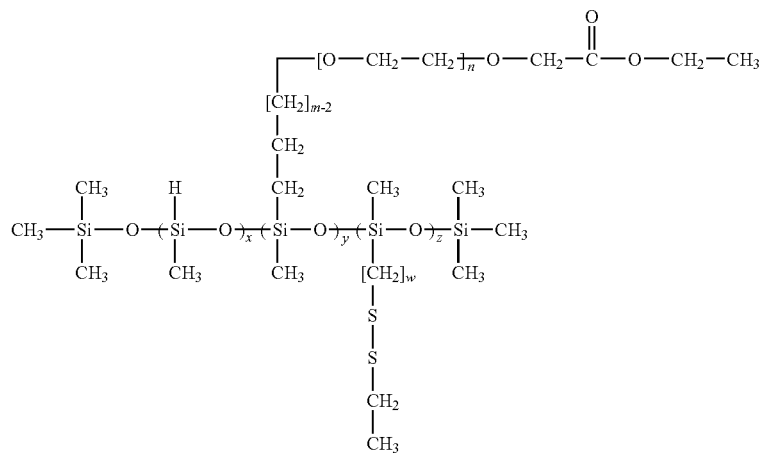

wherein x=11, y=18, z=6, A=H, B=a protected carboxyl group, m=3, n=25, v=1, w=11, D=S—S—$CH_2$—$CH_3$.

Method: 0.77 g (0.7 mmol) of an allyl terminated PEG with protected carboxyl group, as obtained in Example 5, was charged into a pre-dried two-necked flask under argon atmosphere. 0.047 g (0.19 mmol) 11-Ethyldithiol-1-undecene, as obtained in Example 1, was added with 1 ml dry toluene. Six drops of a catalyst platinum 1,3-divinyl-1,1,3,3-tetramethyl-disiloxane complex in toluene (2%) were added. The temperature was increased up to 50° C. while stirring. Then, 0.081 g (1.25 mmol Si—H) poly(methylhydrosiloxane) (Mw=2270) in 1 ml dry toluene was added. The reaction mixture was heated up to 85° C. and the reaction was maintained at that temperature for 72 hours. After that time, heating was stopped and the reaction mixture was cooled down to room temperature in an argon atmosphere. The product was purified by repetitive dissolvation/precipitation in toluene/hexane. The purified product was dried under vacuum at room temperature.

Results: The product yield was 95%. $^1H$ NMR (CDCl3) δ 0.10-0.18 ($SiCH_3$), 0.53 ($SiCH_2$), 1.26-1.31 (COO—$CH_2$—$CH_3$), $\overline{1.30}$-1.35 ($(\overline{(CH_2)_8}$, $\overline{SCH_2}CH_3$), 1.60-1.70 ( $\overline{CH_2}CH_2S$, $\overline{OCH_2}CH_2$), $\overline{2.68}$ ($CH_2\overline{SSCH_2}$), 3.63 (O$\overline{CH_2}CH_2$), 4.17 ($\overline{CH_2}$—COOCH$_2\overline{CH_3}$), $\overline{4.20}$-4.25 (COO—C$\overline{H_2}$—$CH_3$), 4.70 ($\overline{Si}$—H).

Example 8

The Synthesis of Functional Peg Grafted Polysiloxane Polymer 10 Having a Formula

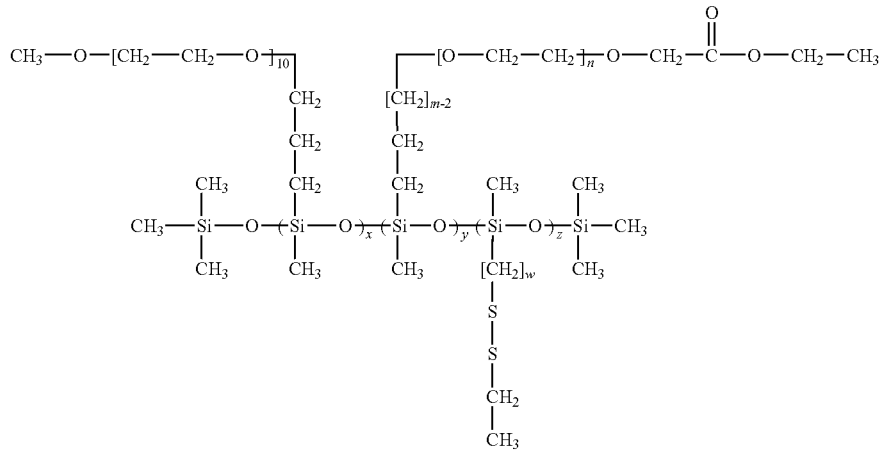

wherein x=14, y=8, z=6, A=—CH$_2$—CH$_2$—CH$_2$—(O—CH$_2$—CH$_2$)$_{10}$—O—CH$_3$, B=a protected carboxyl group, m=3, n=25, v=1, w=11, D=S—S—CH$_2$—CH$_3$.

Method: 0.5 g (0.833 mmol) CH$_2$=CH—CH—(O—CH$_2$—CH$_2$)$_{10}$—O—CH$_3$ (commercial available molecule) and 0.8 g (0.727 mmol) CH$_2$=CH—CH—(O—CH$_2$—CH$_2$)$_{25}$—O—CH$_2$—COOCH$_2$CH$_3$ (synthesised as described in example 5) were charged into a pre-dried two-necked flask with 4 ml dry toluene under argon atmosphere. 0.205 g (0.833 mmol) 11-Ethyldithiol-1-undecene (synthesized as described in example 1) was added in 2 ml dry toluene. 20 drops of a catalyst, e.g., platinum 1,3-divinyl-1,1,3,3-tetramethyldisiloxane complex in toluene (2%), were added. The temperature was increased up to 50° C. while stirring. Then, addition of 0.162 g (2.5 mmol Si—H) poly(methylhydrosiloxane) (Mw=2270) in 2 ml dry toluene followed. The mixture reaction was heated up to 85° C. and the reaction was maintained at that temperature for 72 hours. Afterwards, heating was stopped and the reaction mixture was cooled down to room temperature in an argon atmosphere. The product was purified by repetitive dissolvation/precipitation in toluene/hexane. The purified product was dried under vacuum at room temperature.

Results: The product yield was 95%. $^1$H NMR (CDCl$_3$) δ 0.10-0.18 (SiCH$_3$), 0.53 (SiCH$_2$), 1.26-1.31 (COO—CH$_2$—CH$_3$), 1.30-1.35 ((CH$_2$)$_8$, SCH$_2$CH$_3$), 1.60-1.70 (CH$_2$CH$_2$S, OCH$_2$CH$_2$), 2.68 (CH$_2$SSCH$_2$), 3.38 (OCH$_3$), 3.63 (OCH$_2$CH$_2$), 4.17 (CH$_2$—COOCH$_2$CH$_3$), 4.20-4.25 (COO—CH$_2$—CH$_3$), 4.70 (Si—H).

Step 4:

Under some conditions, such as mentioned in step 2, the R-group can be a protected B group or a protected hydroxyl group. When R is a protected B group, an extra de-protection step is performed in order to activate the B group (see Example 9). When R is a protected hydroxyl group, this hydroxyl group is further converted into a desired B group (see example 10).

Example 9

The De-Protection of a Protected Carboxyl Group in the Polymer Prepared in Example 7

Figure 10:
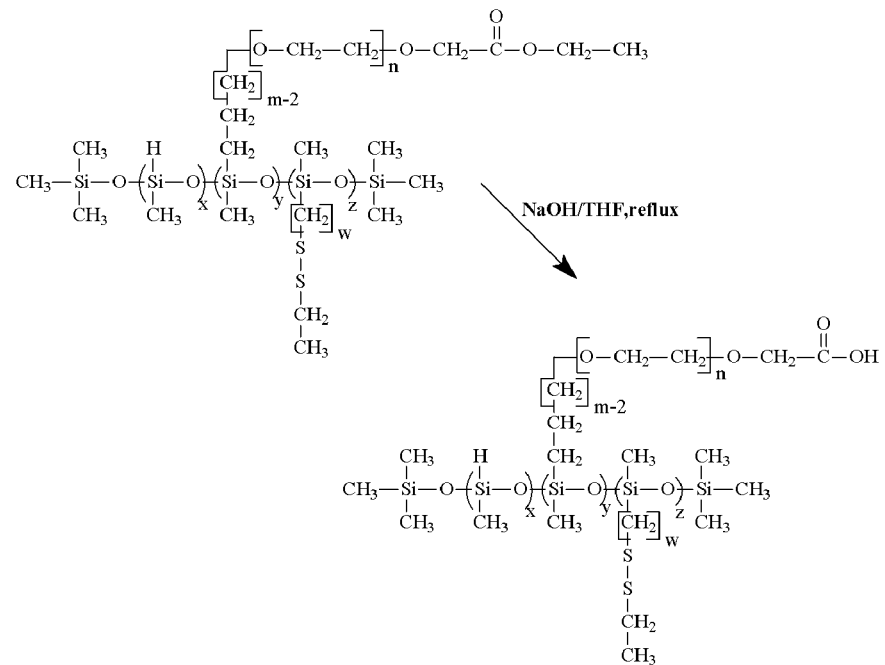
FIG. 10 is a schematic presentation of the de-protection of carboxy group in the polymer.

The de-protection of the carboxyl group in the water soluble functional PEG grafted polysiloxane polymer is illustrated in FIG. 10.

Method: 1.5 g (0.06 mmol) functional PEG grafted polysiloxane polymer (as prepared in example 7) was dissolved in 15 ml THF. A solution of 30 mg NaOH in 15 ml water was added. The reaction mixture was heated to reflux for 1 hour. After cooling down 1M HCl was added to adjust the pH to 1. The mixture was then extracted by CH$_2$Cl$_2$ three times and dried over MgSO$_4$. The solvent was removed and the crude product was purified by repetitive dissolvation/precipitation in toluene/hexane. The purified product was dried under vacuum at room temperature.

Results: The product yield was 99%. $^1$H NMR (CDCl$_3$) δ 0.10-0.18 (SiCH$_3$), 0.53 (SiCH$_2$), 1.30-1.35 ((CH$_2$)$_8$, SCH$_2$CH$_3$), 1.60-1.70 (CH$_2$CH$_2$S, OCH$_2$CH$_2$), 2.68 (CH$_2$SSCH$_2$), 3.63 (OCH$_2$CH$_2$), 4.17 (CH$_2$—COOH).

Example 10

Conversion of a Protected Hydroxyl Group to an Aldehyde Group

Figure 11:
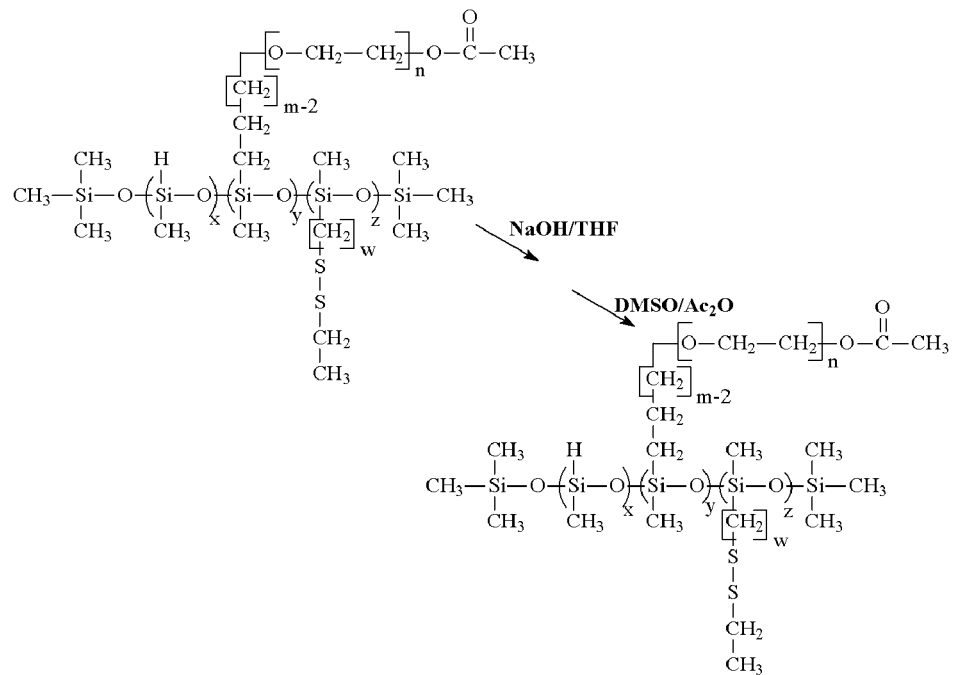
FIG. 11 is a schematic presentation of converting protected hydroxy group to aldehyde group.

The reaction for the conversion of a protected hydroxyl group is illustrated in FIG. 11.

Method: First, 11-Ethyldithiol-1-undecene (as obtained in example 1) and an allyl terminated PEG with protected hydroxyl group (as obtained in example 6) were grafted onto a poly(methylhydrosiloxane) by a similar procedure as described in Example 7. Then, the hydroxyl group was de-protected using a similar procedure as described in example 9. The resulting PEG grafted polysiloxane polymer with, for example, 1.7 mmol, OH group was added to 0.4 g acetic anhydride in 15 ml dimethylsulfoxide and was stirred for 30 hours at room temperature. Then, 100 ml dry ethyl ether was dropwise added into the reaction mixture and re-precipitated three times from CHCl$_3$ with ethyl ether.

Result: the product yield was 80%.

The examples given above are not limiting and by the synthesis described hereinabove also water soluble functional PEG grafted polysiloxane polymer comprising allyl terminated PEG side chains can be prepared having functional groups such as amino, maleimide, haloacetyl, cyano, hydrazide, epoxy, aziridine, sulfonylchloride, trifluoromethyldiaziridine, pyridylsulfide, N-acetyl-imidazole, vinylsulfone, arylazide, benzophenone, isothiocyanate, isocyanate, imidoester, fluorobenzene, phenyl, benzenesulfonamide, dinitrophenyl, triphenymethyl, hydroquinone, biotin or Gly-Arg-Gly-Asp (GRGD) peptide, carboxyl, sulfohydryl, nitriloacetic acid, pyridylsulfide, diazoacetate, protected or activated carboxyl groups, protected or activated amino groups, protected or activated aldehyde groups, protected sulfohydryl.

In the above-described examples, disulfide derivatives were used as the D group. Hereinafter, an example of the synthesis of a functional PEG grafted polysiloxane polymer having a $T_3Si$-functionality as the D group is described.

Step 1:

A first step is the preparation of an allyl-terminated hydrocarbon chain with $T_3Si$— groups, which can also be denoted as allyl-silane. In most circumstances, two commercially available molecules, i.e., allyltriethoxysilane and 7-octenyltrimethoxysilane, are used.

Step 2:

A second step is the preparation of an allyl terminated PEG with R group. This step can be performed as explained in the second step of the method for the preparation of a functional PEG grafted polysiloxane polymers 10 as described hereabove.

Step 3:

A third step is the preparation of functional PEG grafted polysiloxane, which is defined in the third aspect (FIG. 6)

As already discussed above, there are two different preferred ways to perform this third step, i.e., a one step hydrosilation comprising simultaneously grafting the allyl-silane chain obtained in step 1 and the allyl-PEG chain obtained in step 2 onto poly(methylhydrosiloxane) polymer through a hydrosilation reaction, or a two step hydrosilation comprising grafting the allyl-silane chain obtained in step 1 onto tetramethylcyclotetrasiloxane (D4H) by hydrosilation to make silane grafted D4H (denoted as D4-silane) and then grafting the allyl-PEG chain obtained in step 2 onto D4H by hydrosilation to make PEG grafted D4H (denoted as D4-PEG) followed by polymerising the D4-silane and D4-PEG to make a final product. Under most conditions, the first way is preferred, again, as already discussed, because the one-step process has a better controllability than the two-step process.

Example 11

The Synthesis of a Functional Peg Grafted Polysiloxane Polymer with T=a Methoxy Group and with Formula

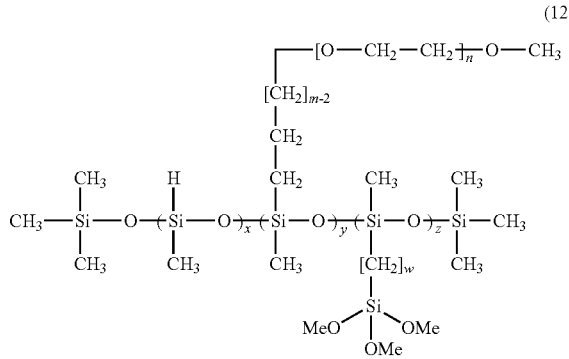

(12)

wherein x=5, y=24, z=6, A=H, B=a methoxy group, m=3, n=25, v=1, w=7.

Method: 1.1 g (1 mmol) $CH_2=CH-CH_2-(O-CH_2-CH_2)_{25}-OCH_3$ was dissolved in 20 ml dry toluene under argon atmosphere. 0.081 g (1.25 mmol Si—H) poly(methylhydrosiloxane) was added followed by the addition of 6 drops of a catalyst (e.g. platinum 1,3-divinyl-1,1,3,3-tetramethyldisiloxane complex in toluene (2%)). The reaction mixture was heated up to 50° C. for 12 hours. Then the temperature was increased up to 80° C. and the reaction was maintained at that temperature for 24 hours. Afterwards, 0.058 g (0.25 mmol) 7-octenyltrimethoxysilane together with 6 drops of a catalyst (e.g. platinum 1,3-divinyl-1,1,3,3-tetramethyldisiloxane complex in toluene (2%)) were added. The reaction was maintained for another 48 hours. After cooling down under argon atmosphere, the product was quickly passed into hexane to purify. The product was dried under vacuum at room temperature.

Result: the product yield was 90%.

Step 4:

If there is a protected B group in the final graft polymer, the de-protection can be performed after the film deposition, and the procedure for de-protection can be same as described in the step 4 of the above described synthesis method according to the second aspect. Similarly, if there is a protected hydroxyl group in the final graft polymer, the conversion of this protected hydroxyl group to the desired functional B group can be performed as described above.

A big advantage of the fact that the functional PEG grafted polysiloxane polymer according to the preferred embodiments is water soluble, is that it can be prepared from an aqueous solution and then be deposited onto a substrate from that aqueous solution. Up until now, such functional PEG grafted polysiloxane polymers had to be prepared in and deposited from a toluene solution. As toluene is a toxic solvent it is preferably avoided when bio-related applications are considered.

Therefore, in a third aspect, a method for the deposition of a film of the functional PEG grafted polysiloxane polymer according to the first aspect from an aqueous solution onto a substrate is provided. The substrate can be any substrate as mentioned in the first aspect. Preferably, the substrate can be a gold substrate, a platinum substrate or a GaAs substrate.

In a first step of the deposition process, the substrate can first be cleaned. After cleaning, the substrate can be rinsed and dried. For example, in case of a gold or platinum substrate, the substrate can be cleaned by immersing it in a so-called "piranha" solution for 15 minutes. The "piranha" solution is a mixture of $H_2O_2$ (30% v/v) and $H_2SO_4$ (96% v/v) mixed in a volume ratio of 1:4 or 3:7. As an alternative to the "piranha" cleaning, also $UV-O_3$ based cleaning or any other suitable cleaning method can be applied. After the cleaning step, the substrate can be taken out of the cleaning solution and thoroughly rinsed with ultra-pure water and absolute ethanol, after which it is dried with nitrogen. In the case of a GaAs substrate, the substrate can first be immersed in acetone and put in ultrasonic bath for 5 minutes. Then, the clean substrate can be etched in a mixture of $H_2O:H_2SO_4:H_2O_2$ (400:20:1(v:v:v)) for 10 seconds after which it can be rinsed by ultra-pure water. Then a second etch can be performed in a concentrated HCl (37% v/v) solution for 1 minute. Afterwards, the GaAs substrate can be thoroughly rinsed with ultra-pure water and dried with $N_2$.

In a next step, the clean substrate is then immediately put into an aqueous solution with a suitable concentration, i.e., a concentration from 0.1 mM to 5 mM of the functional PEG-grafted polysiloxane polymer, as prepared in the second aspect. The concentration used can depend on the kind of substrate and on the kind of functional PEG-grafted polymer used. The deposition time can be optimized according to the quality of the resulting polymeric layer, preferably a monolayer. The quality of the polymeric layer can be determined by the surface coverage, thickness, amount of defects, and the like. The quality of the polymeric layer, preferably a monolayer, can be checked by known multi-characterisation methods, such as, for example, contact angle measurement, cyclic voltammetry, ellipsometry or infrared spectroscopy.

A further direct benefit of the functional PEG grafted polysiloxane polymer according to the preferred embodiments being water soluble is that a layer, preferably a monolayer, of this polymer can easily be patterned during deposition by using a lift-off method. Soft lithography, particularly microcontact printing, has been widely used to obtain chemically patterned surfaces [Geissler, M.; Xia, Y. N., Adv. Mater. 2004, 16, 1249]. However, this method has several drawbacks, such as poor edge resolution and difficulty in precisely aligning the pattern on the chip surface. The latter drawback can seriously harm sensor device fabrication. In this respect, the lift-off method can be the most convenient approach to precisely align the patterned structure onto a substrate [Falconnet, D.; Koenig, A.; Assi, F.; Textor, M. Adv. Funct. Mater. 2004, 14, 749]. It also provides better resolution than micro-contact printing method.

Therefore, in a fourth aspect, a procedure for the preparation of a patterned functional PEG grafted polysiloxane polymer layer, preferably a monolayer, on a substrate is provided. Hereinafter, the deposition of a patterned functional PEG grafted polysiloxane layer, preferably a monolayer, on a substrate, for example, on a gold substrate, by using the lift-off method is described (see FIG. 12).

In a first step, a photoresist 11 is spin coated onto a clean substrate 1. Then a pattern is transferred onto the photoresist 11 from a designed photolithography mask 12 by UV illumination, indicated by arrows 13, and development. After these steps, a patterned photoresist 14 can be obtained on top of the substrate 1. Hence, the substrate 1 can now thus comprise photoresist-protected substrate areas 15 and exposed substrate areas 16. Subsequently, the substrate 1 is immersed into an aqueous solution of the functional PEG grafted polysiloxane polymer for 24 hr. The polymer chemisorbs onto the exposed substrate area 16, indicated by reference number 17, and physically adsorbs on the photoresist-protected area 15, indicated by reference number 18. Afterwards, the substrate 1 is taken out of the polymer solution and is rinsed by an organic solvent. The organic solvent can be any suitable solvent, known by a person skilled in the art. The patterned photoresist 14 together with the physically adsorbed polymer 18 is removed by the organic solvent (lift-off), while the chemisorbed polymer 17 remains on the surface of the substrate 1. In that way, a substrate 1 with a patterned structure 17 of the functional PEG grafted polysiloxane polymer 10 on it may be obtained.

In a fifth aspect, the use of a functional PEG grafted polysiloxane polymer 10 according to the first aspect in biosensor applications is provided. Hereinafter, some applications of a functional PEG grafted polysiloxane polymer 10 according to the first aspect are described. These examples are not limiting and that the functional PEG grafted polysiloxane polymer 10 according to the first aspect can also be used for other biosensor applications.

A first application of the functional PEG grafted polysiloxane polymer 10 according to the first aspect can be the use of this polysiloxane polymer 10 as a protein resistant surface in a biosensor. Therefore, for example, a gold substrate 1 can be modified by a functional PEG grafted polysiloxane polymer 10 according to the first aspect. It has to be understood that, other than a gold substrate, every suitable substrate as discussed previously can be used for this particular application. For this application, the functional PEG grafted polysiloxane polymer 10 is preferably such that it prevents non-specific protein adsorption to the surface of the biosensor. Therefore, the PEG grafted polysiloxane polymer 10 can have a formula as in formula (1) wherein x=4, y=26, z=5, A=H, m=3, n=25, v=1, B=a methoxy group, w=11 and D=S—S—$CH_2$—$CH_3$. In the further description, this polysiloxane polymer is referred to as polymer 26.

The gold substrate 1 can first be cleaned by immersing it in a "piranha" solution for 15 minutes. As an alternative to the "piranha" cleaning, also UV-$O_3$ based cleaning or any other suitable cleaning method can be applied. Then the clean gold substrate 1 can be immersed immediately into an aqueous solution (1 mM) of polymer 26. After deposition for 6 hours, the substrate 1 is taken out of the solution and is rinsed with ultra-pure water and ethanol, after which it is dried with $N_2$. The water contact angle value, the thickness and the surface coverage of the resulting polymer 26 layer on the gold substrate 1 can then be measured by, e.g., cyclic voltammetry. The measurement results for modified substrates thus prepared are summarized in Table I:

TABLE I

Measurement results for a polymer26 layer on a gold substrate

| | Water contact angle (°) | Surface coverage (%) | Thickness (nm) |
|---|---|---|---|
| Gold substrate modified by polymer26 | 31 | 99.0 | 2.00 |
| Gold substrate modified by ODT thiol | 118 | 98.5 | Not measured |

In Table I, 1-octadecanethiol (ODT thiol) is used as a reference. ODT thiol is known to form a well-packed layer structure on a gold substrate 1 [Ulman A., in Thin Films: Self-Assembled Monolayers of Thiols, Vol. 24; Academic Press: New York, 1998]. From the comparison with ODT thiol, it is found that the surface coverage of the polymer 26 layer on the gold substrate is comparable with that of an ODT layer on a gold substrate, which indicates that a complete polymeric monolayer has been formed on the gold substrate. The water contact angle (CA) of the polymer 26 modified gold surface is 31°. It has been reported that CA values can decreased from 60° to 20° with increasing surface PEG density [Ostuni E., Yan L., and Whitesides G. M., Colloids and Surfaces B: Biointerfaces, 1999, 15, 3]. From this it can be concluded that a value of 31° for the CA of the gold substrate modified with the polymer 26 proves that the surface of the gold substrate is enriched with PEG chains.

Human serum Albumin (HSA) and Human Fibrinogen (FB) are used to test the non-specific adsorption of proteins on the gold surface modified by polymer 26. Protein solutions with high concentration, i.e., 2 mg/ml, are prepared. The adsorption tests are performed in a continuous flow (5 μg/ml) mode using a Biacore2000 SPR instrument. The protocol for the adsorption test is preferably as follows:
1) Allowing phosphate-buffered saline (PBS) to flow over the surface for 5 minutes,
2) replacing the flow of PBS with a flow of the protein solution for 1 hour, and
3) rinsing the surface with PBS for 5 minutes.

Figure 13:
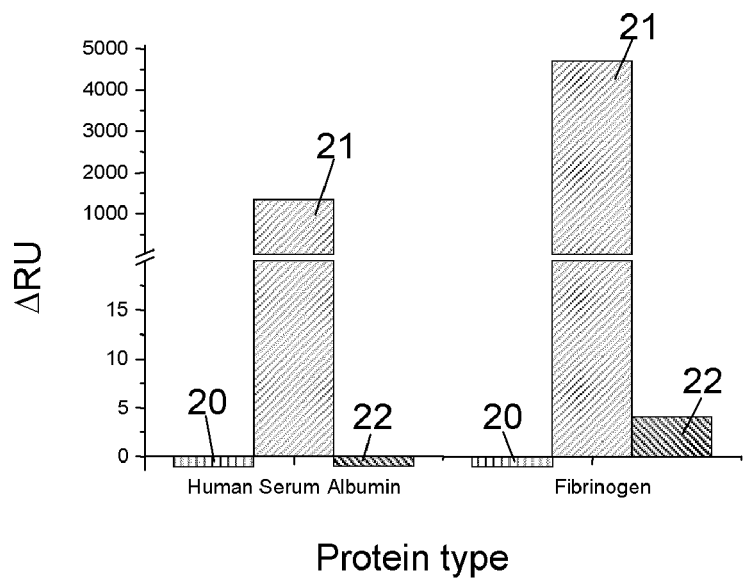
FIG. 13 shows the protein adsorption amount, which was monitored using SPR, on different surfaces.

The change of the signal:

$$\Delta RU = RU_{after\ rinse} - RU_{before\ injection\ of\ protein\ solution}$$

measured before the injection of protein solution and after the PBS rinse is taken as a measure for the protein adsorption amount. The results of the protein adsorption tests are shown in the FIG. 13.

For this experiment, HS—$(CH_2)_{11}$—(O—$CH_2$—$CH_2)_3$—OH (EG3thiol) was used as a reference due to its known ability to prevent non-specific protein adsorption [Ostuni, E.; Chapman, R. G.; Holmlin, R. E.; Takayama, S.; Whitesides, G. M.; Langmuir 2001, 17, 5605]. It can be seen from FIG. 13 that the ΔRU signal 20 for a gold substrate 1 modified with polymer 26 is much lower than the ΔRU signal 21 for a bare gold substrate. Thus, the non-specific protein adsorption can be significantly decreased by modifying the gold surface 1 with polymer 26. Furthermore, the ΔRU signal 20 for a substrate modified with polymer 26 is similar to the ΔRU signal 22 for a gold substrate modified with EG3thiol. Hence, the gold substrate modified with polymer 26 shows a similar ability of preventing non-specific protein adsorption as a substrate modified with EG3thiol. As EG3thiol is known to have the ability to prevent non-specific protein adsorption, it can be concluded that the polymer 26 also has the ability to prevent non-specific protein adsorption.

A second application of the functional PEG grafted polysiloxane polymer 10 according to the first aspect can be the use of this polysiloxane polymer 10 as a surface for guiding cell growth, which can be used for a cell based sensor and cell related research. Herefore, for example, a gold substrate with a patterned functional PEG grafted polysiloxane polymer 10 is formed for guiding cell growth. A polymer suitable for this second application can the same polymer as in the first application. Other than a gold substrate, any suitable substrate as discussed before can be used according to this second application.

Figure 12:
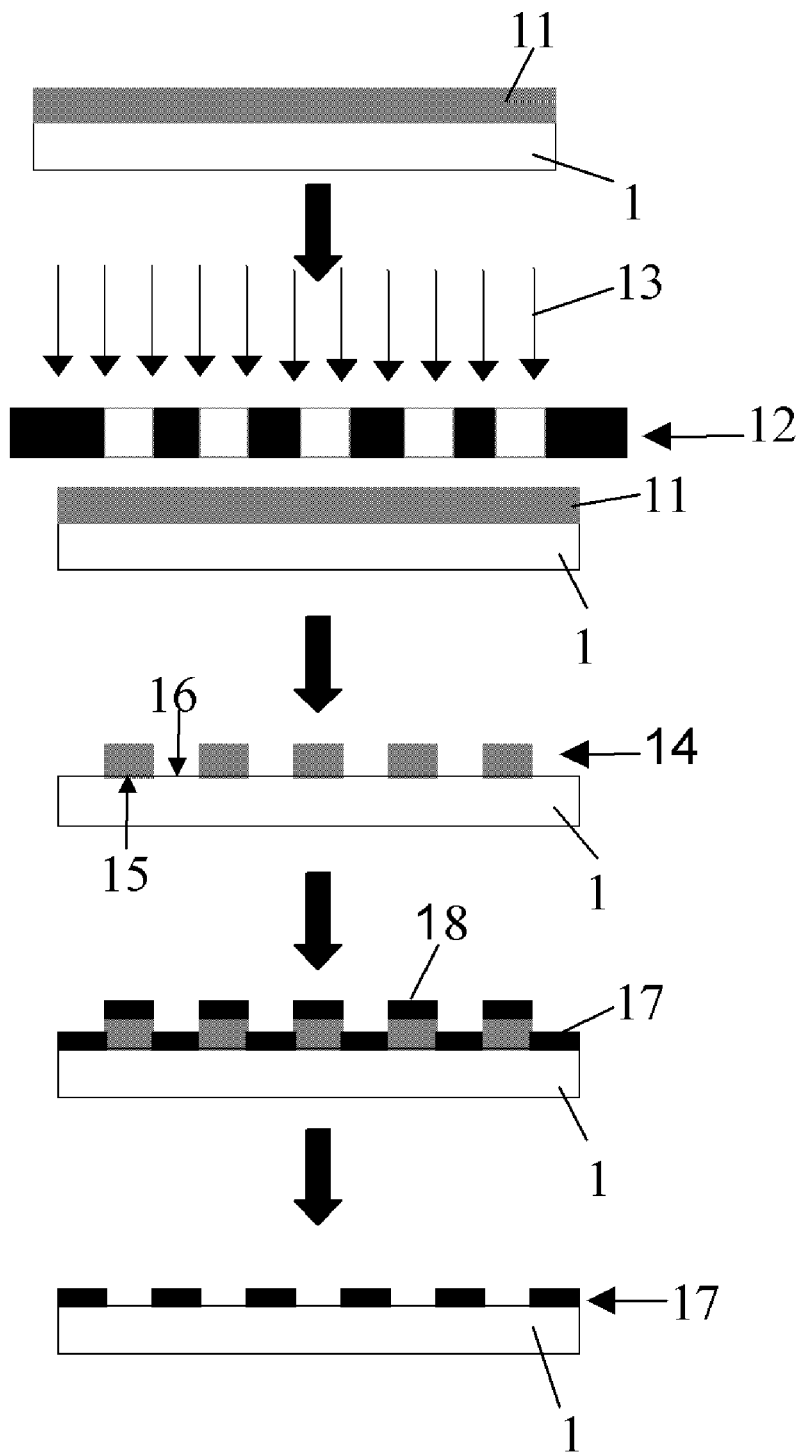
FIG. 12 is a schematic illustration for the procedure of lift-off method.

A gold substrate 1 with a patterned polymer 26 structure can be achieved by using the lift-off method described in the fourth aspect of the invention and as illustrated in FIG. 12. A suitable photoresist 11 can first be spin coated onto a clean gold substrate 1. Then, a required pattern can be transferred to the photoresist 11 from a designed photolithography mask 12 by means of UV illumination followed by development. In that way, a gold substrate 1 which comprises photoresist-protected area 15 and exposed gold area 16 can be formed. Subsequently, the gold substrate 1 can be immersed into an aqueous solution of polymer 26 for 24 hours. During this time, the polymer 26 chemisorbs onto the exposed gold area 16 and physically adsorbs onto the photoresist-protected area 15. Next, the substrate 1 can be taken out of the aqueous polymer 26 solution and can be rinsed by a suitable organic solvent. The patterned photoresist 14 together with the physically adsorbed polymer 26 is removed by the organic solvent, while the chemisorbed polymer 26 remains on the gold substrate 1. Finally, a gold substrate 1 with patterned polymer 26 structure on top is obtained.

Figure 14:
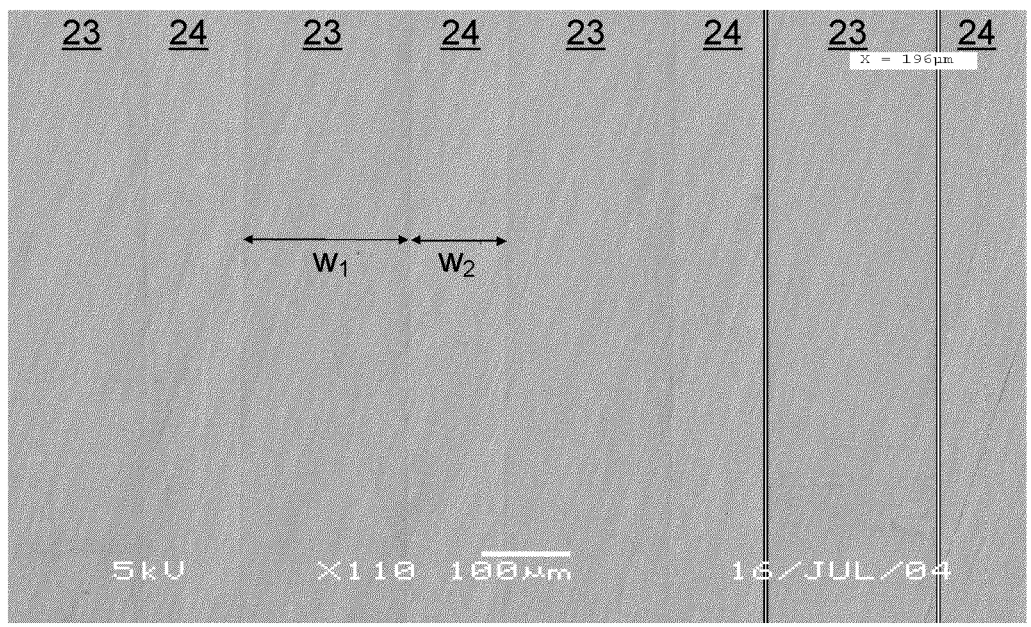
FIG. 14 is a SEM image of patterned polymer26 on the gold substrate.

FIG. 14 shows a SEM image of a patterned polymer 26 layer. In this figure, the wider, darker area 23 indicates polymer 26 strips and can, in the example given, have a width $w_1$ of about 200 μm. The smaller, brighter area 24 is the spaces between the polymer 26 strips, i.e., gold substrate 1, and can, in the example given, have a width $w_2$ of about 100 μm. This example is not limiting and other patterns or strips with other widths can be formed using the method as described above.

Figure 15:
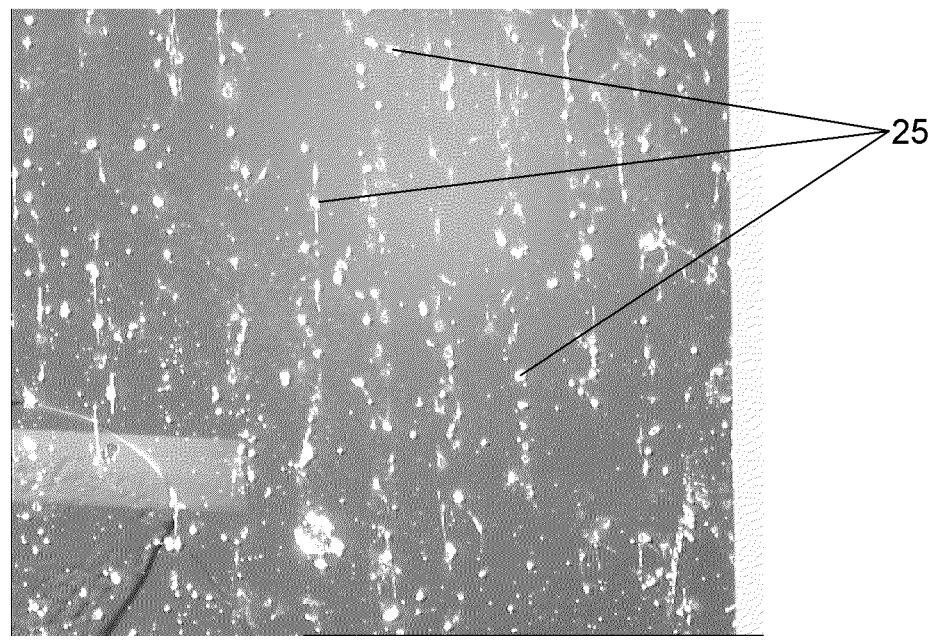
FIG. 15 illustrates a cells growth pattern image taken by inverted microscopy.

The ability to use this kind of patterned polymer layers on a substrate 1 for guiding cell growth has been tested. Herefore, fibroblast cells are cultured on the gold substrate 1 that is covered with the polymer 26 pattern as shown in FIG. 14. The cells growth result is shown in FIG. 15. The white spots in the image indicate cell bodies 25. The results illustrated in FIGS. 14 and 15 demonstrate the principle of the second application. However, by changing the parameters of the process, such as, e.g., polymer composition or pattern conditions, improved results can be obtained.

FIG. 15 shows that the fibroblast cell growth follows the patterned structure on the substrate 1. Because the polymer 26 can prevent non-specific protein adsorption, as was illustrated in the first application of this fifth aspect, the proteins in the culture media only stick on those parts of the substrate 1 where no polymer 26 strips 23 are present, i.e., on the strips indicated by reference number 24 in FIG. 14. Hence, the proteins only stick at the strips 24 in between the polymer 26 strips 23. Consequently, the cells can only grow at the area where proteins are adsorbed and thus follow the pattern of the patterned polymer 26 layer.

A third application of the functional PEG grafted polysiloxane polymer 10 according to the first aspect can be use as an interface in a biosensor. Herefore, a Surface Plasmon Resonance (SPR) chip can be modified by a functional PEG grafted polysiloxane polymer 10 suitable for antigen, such as Human Transferrin, detection. A suitable polymer for this application can be a polymer having a formula as formula (1) wherein x=11, y=18, z=6, A=H, m=3, n=25, v=1, B=a COOH group, w=11 and D=S—S—$CH_2$—$CH_3$. In the further description, this polymer is referred to as polymer COOH. This is only an example of a polymer according to the preferred embodiments which can be used for biosensor applications. For obtaining an optimal functioning of the biosensor, preferably, x+y+z is from 8 to 40, preferably y is higher than 8, preferably m is less than 5, preferably n is from 10 to 25 and preferably w is from 5 to 11. y can, for example, depend on the type of the biologically-sensitive materials or on the type of antibody used for the application.

A SPR chip, e.g., a J1 chip obtainable by BIACORE and having no surface modification, can be cleaned by using one of the procedures as described in the third aspect. The clean J1 chip can then, immediately after cleaning, be immersed into an aqueous solution (1 mM) of the polymer COOH for 24 hours. After the J1 chip is taken out of the solution, it can be rinsed with water and ethanol and dried by $N_2$. The antigen, in the example given, Human Transferrin, detection can then be performed on a Biacore2000 SPR system.

Figure 16:
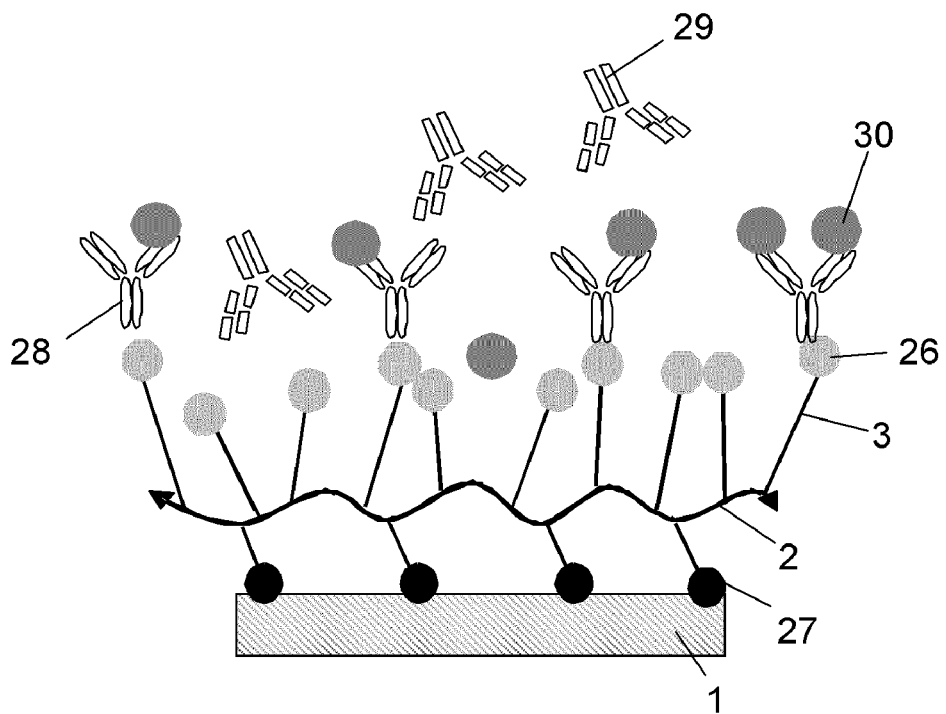
FIG. 16 is a schematic presentation of the antigen detection procedure.

A schematic illustration of the antigen detection principle is shown in FIG. 16. The procedure for antigen detection can be as follows:

1) the COOH groups 26 of the PEG chains 3 grafted on the polysiloxane backbone 2 of the polymeric layer, preferably a monolayer, can be activated by N-ethyl-N'-(3-dimethyl aminopropyl)-carbodiimide hydrochloride/N-hydroxysuccimide (or EDC/NHS) for 8 minutes. The polymeric layer is attached to the surface of the substrate 1 through, in the example given, disulfide groups 27.
2) Anti-Human Transferrin 28 (anti-HT 31) (500 μg/ml in formatic acid buffer) is immobilised onto the polymeric layer, preferably a monolayer, through a COOH—$NH_2$ binding;
3) 1M ethanolamine is sent over the surface for blocking any not reacted COOH group 26;
4) Human IgG 29 (HigG 29) with different concentrations (10 μg/ml and 100 μg/ml) is sent over the surface in sequence in order to check the non-specific binding. The surface is regenerated by 10 mM glycine (pH=2.2) in between binding of the HIgG from different concentrations.

5) Finally, Human Transferrin 30 (HT) with different concentrations (from 1 ng/ml to 10 µg/ml) is sent over the surface in sequence in order to check the antigen, i.e., anti-HT 28, detection ability. The surface is regenerated by 10 mM glycine (pH=2.2), in between binding of the HT from different concentrations.

Figure 17:
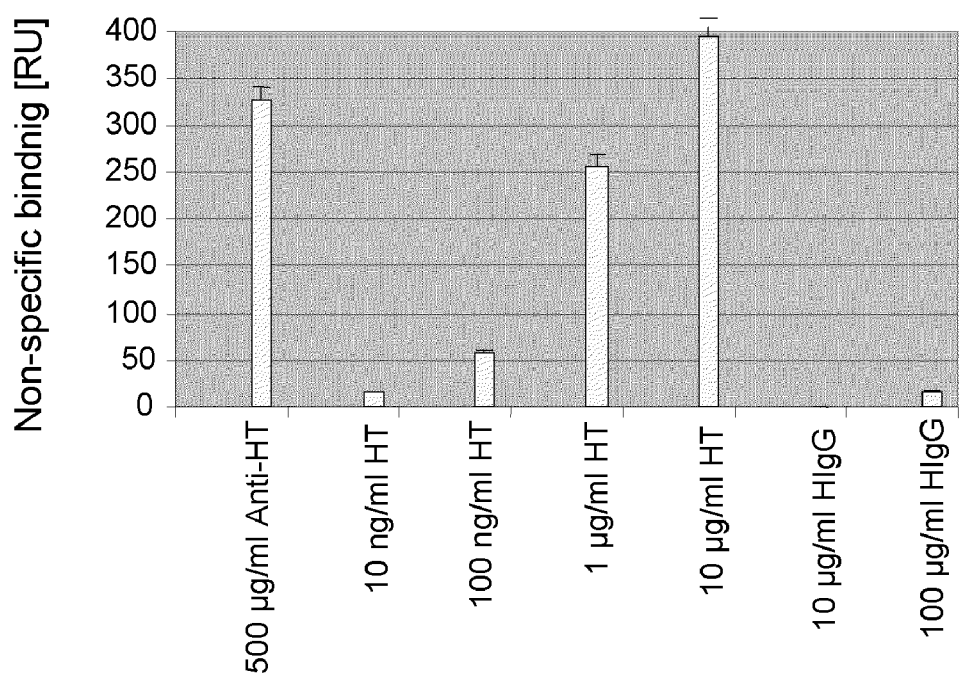
FIG. 17 illustrates specific binding, nonspecific binding and antigen detection amount on the polymer COOH modified surface.

The test results are shown in FIG. 17. This figure shows that about 4000 RU of anti-HT 28 is immobilised onto the polymeric layer, preferably monolayer, with COOH groups 26, which indicates a high specific antibody binding capacity of this polymeric layer, preferably a monolayer. The detection limit of the Biacore2000 is 1RU, and 1RU corresponds to 0.1 ng/cm$^2$. Thus, 4000 RU corresponds with a concentration of 400 ng/cm$^2$. On the other hand, the non-specific adsorption, i.e., the HIgG adsorption, on this polymeric layer, preferably monolayer, is very limited. It is not detectable for a 10 µg/ml concentration of HigG 29 and only 20 RU for a 100 µg/ml concentration of HigG 29. Most importantly, this polymeric layer, preferably monolayer, with immobilized anti-HT antibodies 28 showed very good HT antigen detection ability. A HT antigen concentration as low as 10 ng/ml can be detected. This example is only given for the sake of explanation. With the polymer of the preferred embodiments, however, it can be possible to detect concentrations of 0.1 ng/ml or less by varying the surface density of the COOH groups.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method for fabricating a biosensor, comprising:
    immersing a substrate in an aqueous solution comprising a water soluble functional polyethylene glycol-grafted polysiloxane polymer comprising a polysiloxane backbone and functional polyethylene glycol side chains, the polymer having a general formula:

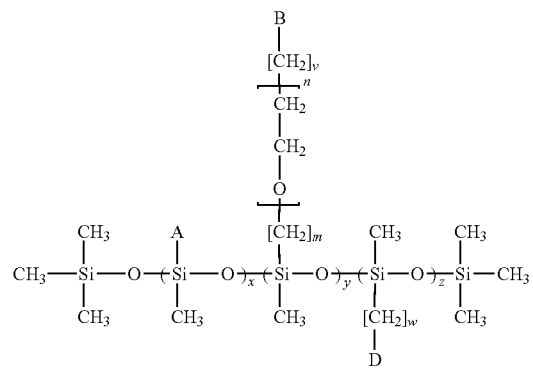

wherein A is selected from the group consisting of hydrogen, methyl, and methoxy, B is a functional group capable of binding to a biologically-sensitive material and is selected from the group consisting of a carboxyl group, an amino group, an aldehyde, a sulfohydryl, a hydroxyl group, a maleimide, a nitriloacetic acid, a haloacetyl, a cyano, a hydrazide, an epoxy, an aziridine, a sulfonylchloride, a trifluoromethyldiaziridine, a pyridylsulfide, a N-acetyl-imidazole, a vinylsulfone, an arylazide, a diazoacetate, a benzophenone, an isothiocyanate, an isocyanate, an imidoester, a fluorobenzene, a phenyl, a benzenesulfonamide, a dinitrophenyl, a triphenymethyl, a hydroquinone, a biotin, and a short peptide, D is a functional group capable of binding to a substrate and is selected from the group consisting of $CH_3$—$CH_2$—S—S—, a 5-(1,2-dithiolan-3-yl)pentanoic acid ester, a cyclic disulfide within a 5-membered ring with general formula:

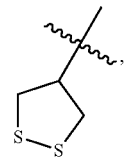

a TT'T"Si-group, a TT'RSi-group, and a TRR'Si-group, wherein T, T' and T" are each independently methoxy or ethoxy groups and wherein R and R' are independently alkyl groups with a formula —$(CH_2)n'$-$CH_3$, wherein n' is an integer of from 0 to 3, and m is an integer from 3 to 5, v is an integer from 0 to 5, w is an integer from 4 to 11, x is an integer from 0 to 35, z is an integer from 1 to 33, x+y+z is an integer from 8 to 40, n is an integer from 8 to 30, and y is an integer from 7 to 35, wherein the immersing is conducted in an absence of toluene, whereby a layer of the functional polyethylene glycol-grafted polysiloxane polymer is deposited on the substrate, wherein the substrate with deposited functional polyethylene glycol-grafted polymer comprises a component of a biosensor.

2. The method according to claim 1, wherein the aqueous solution comprises from about 0.1 mM to about 5 mM of the functional polyethylene glycol-grafted polymer.

3. The method according to claim 1, wherein the substrate is selected from the group consisting of gold, silver, platinum, copper, GaAs, silicon, glass, silica, quartz, and metal oxide.

4. The method according to claim 3, wherein the metal oxide is selected from the group consisting of silicon oxide, indium oxide tin oxide, magnesium oxide, titanium oxide, tantalum oxide, zirconium oxide, niobium oxide, palladium oxide, platinum oxide, and ruthenium oxide.

5. The method according to claim 1, further comprising:
depositing a photoresist onto the substrate,
patterning the photoresist to form a patterned photoresist on top of the substrate, the substrate thus comprising a photoresist-protected substrate area and an exposed substrate area, and
rinsing the substrate with an organic solvent, whereby the patterned photoresist and the functional polyethylene glycol-grafted polysiloxane polymer at the photoresist-protected area of the substrate are removed, wherein the depositing step and patterning step are performed before the immersion step, and wherein the rinsing step is performed after the immersion step, whereby a patterned functional polyethylene glycol-grafted polysiloxane polymer is formed onto the substrate.

6. The method according to claim 5, wherein patterning the photoresist comprises transferring the photoresist from a designed photolithography mask by UV illumination and development.

7. The method according to claim 1, wherein the immersion step has a duration of about 24 hours or less.

8. The method according to claim 1, further comprising a step of:
synthesizing, in an aqueous solution, the water soluble functional polyethylene glycol-grafted polysiloxane polymer, by:
providing an allyl terminated hydrocarbon having a terminal functional group D and having a general formula:

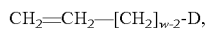
$CH_2=CH_2-[CH_2]_{w-2}-D$, providing an allyl terminated polyethylene glycol polymer chain having a functional end group R and having a general formula:

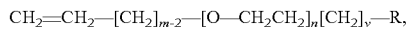
$CH_2=CH_2-[CH_2]_{m-2}-[O-CH_2CH_2]_n[CH_2]_v-R$, wherein R is the same as B or wherein R is a protected functional group from which B is derived; and
grafting the allyl terminated hydrocarbon and the allyl terminated polyethylene glycol polymer chain onto a polysiloxane backbone having a general formula:

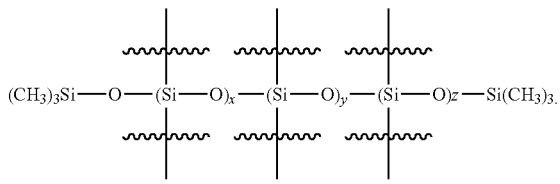

9. The method according to claim 8, wherein grafting said allyl terminated hydrocarbon and said allyl terminated polyethylene glycol polymer chain onto the polysiloxane backbone is performed by simultaneously grafting the allyl terminated hydrocarbon and the allyl terminated polyethylene glycol polymer chain onto the polysiloxane backbone.

10. The method according to claim 8, wherein grafting the allyl terminated hydrocarbon and the allyl terminated polyethylene glycol polymer chain onto the polysiloxane backbone is performed by sequentially grafting the allyl terminated alkane and the allyl terminated polyethylene glycol polymer chain onto the polysiloxane backbone.

11. The method according to claim 8, wherein the functional end group R is capable of binding to a biologically-sensitive material and is selected from the group consisting of a carboxyl group, an amino group, an aldehyde, a sulfohydryl, a maleimide, a nitriloacetic acid, a haloacetyl, a cyano, a hydrazide, an epoxy, an aziridine, a sulfonylchloride, a trifluoromethyldiaziridine, a pyridylsulfide, a N-acetyl-imidazole, a vinylsulfone, an arylazide, a diazoacetate, a benzophenone, a isothiocyanate, an isocyanate, an imidoester, a fluorobenzene, a phenyl, a benzenesulfonamide, a dinitrophenyl, a triphenymethyl, a hydroquinone, a biotin, and a short peptide.

12. The method according to claim 8, wherein the functional group R is a protected functional group from which B is derived.

13. The method according to claim 12, further comprising de-protecting the functional group R, whereby the functional group R is activated to the functional group B.

14. The method according to claim 8, wherein the functional group R is a protected hydroxyl group, further comprising converting the protected hydroxyl group to the functional group B.

15. The method according to claim 8, wherein the functional end group R is the same as functional group B.

16. The method according to claim 1, wherein the layer of the functional polyethylene glycol-grafted polysiloxane polymer is deposited on the substrate in a stratified structure, wherein side chains having groups capable of interacting with biologically-sensitive material are enriched at an outermost surface of the layer, wherein side chains having groups capable of binding to the substrate are enriched at a surface of the substrate and wherein the polysiloxane backbones are present in between.

17. A biosensor comprising a substrate comprising a layer of a water soluble functional polyethylene glycol-grafted polysiloxane polymer comprising a polysiloxane backbone and functional polyethylene glycol side chains, the polymer having a general formula:

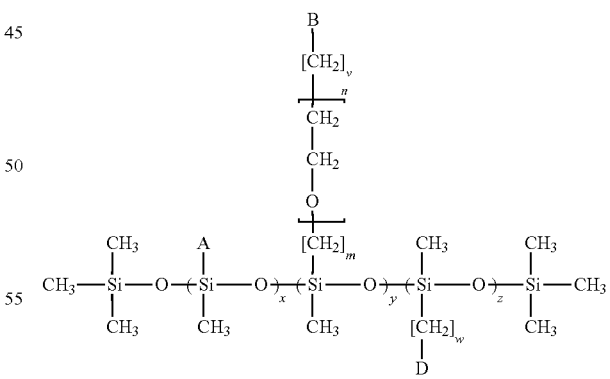

wherein A is selected from the group consisting of hydrogen, methyl, and methoxy,
B is a functional group capable of binding to a biologically-sensitive material and is selected from the group consisting of an amino group, an aldehyde, a biotin, a maleimide, and a short peptide
D is a functional group capable of binding to a substrate and is selected from the group consisting of $CH_3-$ $CH_2$—S—S—, a 5-(1,2-dithiolan-3-yl)pentanoic acid ester, a cyclic disulfide within a 5-membered ring with general formula:

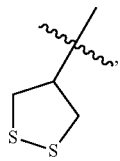

a TT'T"Si-group, a TT'RSi-group, and a TRR'Si-group, wherein T, T' and T" are each independently methoxy or ethoxy groups and wherein R and R' are independently alkyl groups with a formula —$(CH_2)_{n'}$-$CH_3$, wherein n' is an integer of from 0 to 3, and m is an integer from 3 to 5, v is an integer from 0 to 5, w is an integer from 4 to 11, x is an integer from 0 to 35, z is an integer from 1 to 33, x+y+z is an integer from 8 to 40, n is an integer from 8 to 30, and y is an integer from 7 to 35.

18. The biosensor according to claim 17, wherein the short peptide contains from 2 to 10 amino acids.

19. The biosensor according to claim 17, wherein the short peptide is a Gly-Arg-Gly-Asp peptide.

20. A biosensor comprising a substrate comprising a layer of a water soluble functional polyethylene glycol-grafted polysiloxane polymer comprising a polysiloxane backbone and functional polyethylene glycol side chains, the polymer having a general formula:

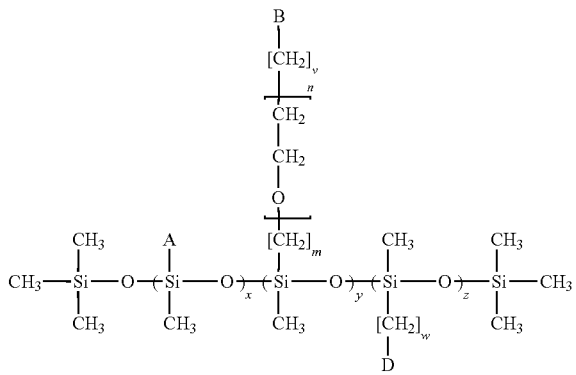

wherein A is selected from the group consisting of hydrogen, methyl, and methoxy, B is a functional group capable of binding to a biologically-sensitive material and is selected from the group consisting of a carboxyl group, an amino group, an aldehyde, a sulfohydryl, a hydroxyl group, a maleimide, a nitriloacetic acid, a haloacetyl, a cyano, a hydrazide, an epoxy, an aziridine, a sulfonylchloride, a trifluoromethyldiaziridine, a pyridylsulfide, a N-acetyl-imidazole, a vinylsulfone, an arylazide, a diazoacetate, a benzophenone, an isothiocyanate, an isocyanate, an imidoester, a fluorobenzene, a phenyl, a benzenesulfonamide, a dinitrophenyl, a triphenymethyl, a hydroquinone, a biotin, and a short peptide, D is a functional group capable of binding to a substrate and is a 5-(1,2-dithiolan-3-yl)pentanoic acid ester, and m is an integer from 3 to 5, v is an integer from 0 to 5, w is an integer from 4 to 11, x is an integer from 0 to 35, z is an integer from 1 to 33, x+y+z is an integer from 8 to 40, n is an integer from 8 to 30, and y is an integer from 7 to 35.

* * * * *

UNITED STATES PATENT AND TRADEMARK OFFICE
CERTIFICATE OF CORRECTION

PATENT NO.         : 8,198,390 B2
APPLICATION NO.    : 12/763062
DATED              : June 12, 2012
INVENTOR(S)        : Zhou et al.

It is certified that error appears in the above-identified patent and that said Letters Patent is hereby corrected as shown below:

| Issued Patent | | Description of Discrepancy |
|---|---|---|
| Column | Line | |
| On the Title Page: (Item 54) and Col. 1, Title | 1 | Change "SELF ASSEMBLED" to --SELFASSEMBLED--. |
| On the Title Page: (Item 56) Col. 1 | 9 | Under Other Publications, change "Alanethiols" to --Alkanethiols--. |
| On the Title Page: (Item 56) Col. 1 | 11 | Under Other Publications, change "Characerization" to --Characterization--. |
| On the Title Page: (Item 56) Col. 1 | 17 | Under Other Publications, change "Bioeletronics" to --Bioelectronics--. |
| On the Title Page: (Item 56) Col. 1 | 19 | Under Other Publications, change "Micropattems" to --Micropatterns--. |
| On the Title Page: (Item 56) Col. 2 | 7 | Under Other Publications, change "Experimantal" to --Experimental--. |
| On the Title Page: (Item 56) Col. 2 | 16 | Under Other Publications, change "Siland" to --Silane--. |
| On the Title Page: (Item 56) Col. 2 | 16 | Under Other Publications, change "Biomatetial" to --Biomaterial--. |
| On the Title Page: (Item 56) Col. 2 | 19 | Under Other Publications, change "Immescible" to --Immiscible--. |

Signed and Sealed this
Ninth Day of October, 2012

David J. Kappos
*Director of the United States Patent and Trademark Office*

CERTIFICATE OF CORRECTION (continued)
U.S. Pat. No. 8,198,390 B2

| | | |
|---|---|---|
| On the Title Page: (Item 56) Col. 2 | 27 | Under Other Publications, change "Adsorbtion" to --Adsorption--. |
| On the Title Page: (Item 57) Abstract | 13 | Change "h" to --has--. |
| In the Specifications: | | |
| 5 | 20-21 | Change "triphenymethyl," to --triphenylmethyl,--. |
| 5 | 27 | Change "$CH_3$—$CH_2$—S—S—," to --$CH_3$—$CH_2$—S—S—;--. |
| 7 | 14 | Change "triphenymethyl," to --triphenylmethyl,--. |
| 9 | 32 | Change "pentanate." to --pentanoate.--. |
| 9 | 51 | Change "polymer26" to --polymer 26--. |
| 11 | 15 (Approx.) | Change "an" to --and--. |
| 12 | 45 | Change "triphenymethyl," to --triphenylmethyl,--. |
| 13 | 34 | Change "above." to --above,--. |
| 16 | 63 | Change "(Fluke)" to --(Fluka)--. |
| 19 | 41 | Change "Wherein" to --wherein--. |
| 19 | 41 | Change "R=$NH_2$" to --R=$NH_2$--. |
| 19 | 44 | Change "(R=$NH_2$)" to --(R=$NH_2$)--. |
| 20 | 9 | Change "Wherein" to --wherein--. |
| 20 | 10 | Change "R=$COOCH_2CH_3$" to --R=$COOCH_2CH_3$--. |
| 20 | 15 (Approx.) | Change "(R=$COOCH_2CH_3$)" to --(R=$COOCH_2CH_3$)--. |
| 20 | 49 | Change "(CH2=CH—$CH_2$—O)," to --($CH_2$=CH—$CH_2$—O),--. |
| 20 | 50 | Change "(C<u>H2</u>=CH—)," to --(C<u>$H_2$</u>=CH—),--. |
| 20 | 56 | Change "(C<u>H2</u>=CH—)," to --(C<u>$H_2$</u>=CH—),--. |
| 20 | 57 | Change "(CH2=C<u>H</u>—)." to --($CH_2$=C<u>H</u>—).--. |
| 20 | 62 | Change "Where" to --where--. |
| 20 | 66-67 | Change "(R=O—$COCH_2CH_3$)" to --R=O—($COCH_2CH_3$)--. |
| 21 | 7 | Change "$Ac_2O$," to --$Ac_2O$.--. |

CERTIFICATE OF CORRECTION (continued)
U.S. Pat. No. 8,198,390 B2

| | | |
|---|---|---|
| 22 | 18 | Change "Having" to --having--. |
| 23 | 2 | Change "Peg" to --PEG--. |
| 25 | 8 | Change "triphenymethyl," to --triphenylmethyl,--. |
| 25 | 19 | Change "allylltriethoxysilane" to --allyltriethoxysilane--. |
| 25 | 29 | Change "(FIG. 6)" to --(FIG. 6).--. |
| 25 | 45 | Change "Peg" to --PEG--. |
| 28 | 29 (Approx.) | Change "polymer26" to --polymer 26--. |
| 28 | 35 | Change "polymer26" to --polymer 26--. |
| 29 | 33 | Change "can" to --can be--. |
| 30 | 63 | Change "(HigG 29)" to --(HIgG 29)--. |
| 31 | 18 (Approx.) | Change "HigG 29" to --HIgG 29--. |
| 31 | 19 (Approx.) | Change "HigG 29." to --HIgG 29.--. |

In the Claims:

| | | |
|---|---|---|
| 32 | 30-31 | In Claim 1, change "triphenymethyl," to --triphenylmethyl,--. |
| 33 | 3 | In Claim 4, change "indium oxide" to --indium oxide,--. |
| 34 | 14 (Approx.) | In Claim 11, change "triphenymethyl," to --triphenylmethyl,--. |
| 36 | 28 | In Claim 20, change "triphenymethyl," to --triphenylmethyl,--. |